(12) United States Patent
Yushin et al.

(10) Patent No.: US 11,177,509 B2
(45) Date of Patent: Nov. 16, 2021

(54) ELECTROLYTES FOR A METAL-ION BATTERY CELL WITH HIGH-CAPACITY, MICRON-SCALE, VOLUME-CHANGING ANODE PARTICLES

(71) Applicant: Sila Nanotechnologies, Inc., Alameda, CA (US)

(72) Inventors: Gleb Yushin, Atlanta, GA (US); Ashleigh Ward, Oakland, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 0 days.

(21) Appl. No.: 16/128,351

(22) Filed: Sep. 11, 2018

(65) Prior Publication Data

US 2019/0081360 A1 Mar. 14, 2019

Related U.S. Application Data

(60) Provisional application No. 62/557,449, filed on Sep. 12, 2017.

(51) Int. Cl.
| | |
|---|---|
| H01M 10/0569 | (2010.01) |
| H01M 4/525 | (2010.01) |
| H01M 4/505 | (2010.01) |
| H01M 10/0568 | (2010.01) |
| H01M 10/0525 | (2010.01) |
| H01M 4/38 | (2006.01) |

(52) U.S. Cl.
CPC ....... *H01M 10/0569* (2013.01); *H01M 4/386* (2013.01); *H01M 4/505* (2013.01); *H01M 4/525* (2013.01); *H01M 10/0525* (2013.01); *H01M 10/0568* (2013.01); *H01M 2300/0037* (2013.01)

(58) Field of Classification Search
CPC ............... H01M 10/052; H01M 4/386; H01M 10/0567; H01M 10/0569; H01M 6/168; H01M 10/056; H01M 2004/027; H01M 2300/0028; H01M 2300/004; H01M 4/134; H01M 4/1395; H01M 6/162
See application file for complete search history.

(56) References Cited

U.S. PATENT DOCUMENTS

| | | | | |
|---|---|---|---|---|
| 2013/0224583 | A1* | 8/2013 | Green | H01M 4/1395 429/211 |
| 2013/0309573 | A1* | 11/2013 | Ohba | H01M 10/0525 429/218.1 |
| 2014/0170524 | A1* | 6/2014 | Chiang | H01M 4/485 429/482 |
| 2014/0335410 | A1* | 11/2014 | Loveridge | H01M 4/13 429/217 |

(Continued)

*Primary Examiner* — Imran Akram
(74) *Attorney, Agent, or Firm* — Muncy, Geissler, Olds & Lowe, P.C.; Daniel Podhajny

(57) ABSTRACT

In an embodiment, a metal-ion battery cell comprises an anode electrode, a cathode electrode, a separator, and electrolyte ionically coupling the anode electrode and the cathode electrode. The anode electrode is a high-capacity electrode (e.g., in the range of about 2 mAh/cm$^2$ to about 10 mAh/cm$^2$) and the cathode electrode comprises an intercalation-type active material including at least Li, one or more metals, and oxygen. The electrolyte includes a solvent composition having low-melting point (LMP) solvent(s) in the range from about 10 vol. % to about 95 vol. % of the solvent composition.

20 Claims, 13 Drawing Sheets

(56) References Cited

U.S. PATENT DOCUMENTS

2015/0236372 A1* 8/2015 Yushin ................ H01M 4/1397
429/126
2015/0280221 A1* 10/2015 Abdelsalam .......... H01M 4/133
429/217

* cited by examiner

ELECTROLYTES FOR A METAL-ION BATTERY CELL WITH HIGH-CAPACITY, MICRON-SCALE, VOLUME-CHANGING ANODE PARTICLES

CLAIM OF PRIORITY UNDER 35 U.S.C. § 119

The present application for patent claims the benefit of U.S. Provisional Application No. 62/557,449, entitled "Improved Electrolytes for Automotive Cells with High-Capacity Anodes based on Micron-Scale Volume-Changing Particles," filed Sep. 12, 2017, which is expressly incorporated herein by reference in its entirety.

BACKGROUND

Field

The present disclosure relates generally to energy storage devices, and more particularly to battery technology and the like.

Background

Owing in part to their relatively high energy densities, relatively high specific energy, light weight, and potential for long lifetimes, advanced rechargeable batteries are desirable for a wide range of consumer electronics, electric vehicle, grid storage and other important applications.

However, despite the increasing commercial prevalence of batteries, further development of these batteries is needed, particularly for applications in low- or zero-emission, hybrid-electrical or fully-electrical vehicles, consumer electronics, wearable devices, energy-efficient cargo ships and locomotives, drones, aerospace applications, and power grids. In particular, further improvements are desired for various rechargeable batteries, such as rechargeable Li and Li-ion batteries, rechargeable Na and Na-ion batteries, rechargeable K and K-ion batteries, rechargeable Ca and Ca-ion batteries, and rechargeable Mg and Mg-ion batteries, to name a few.

A broad range of electrolyte compositions may be utilized in the construction of Li and Li-ion batteries and other metal and metal-ion batteries. However, for improved cell performance (e.g., low and stable resistance, high cycling stability, high rate capability, etc.), the optimal choice of electrolyte needs to be developed for specific types and specific sizes of active particles in both the anode and cathode, as well as the specific operational conditions (e.g., temperature, charge rate, discharge rate, voltage range, capacity utilization, etc.). In many cases, the choice of electrolyte components and their ratios is not trivial and can be counter-intuitive.

In certain types of rechargeable batteries, charge storing anode materials may be produced as high-capacity (nano) composite powders, which exhibit moderately high volume changes (e.g., 8-180 vol. %) during the first charge-discharge cycle and moderate volume changes (e.g., 5-50 vol. %) during the subsequent charge-discharge cycles. A subset of such charge-storing anode particles includes anode particles with an average size (e.g., diameter or thickness) in the range of around 0.2 to around 40 microns. Such a class of charge-storing particles offers great promises for scalable manufacturing and achieving high cell-level energy density and other performance characteristics. Unfortunately, such particles are relatively new and their use in cells using conventional electrolytes may result in relatively poor cell performance characteristics and limited cycle stability. Cell performance may become particularly poor when the high-capacity (nano)composite anode capacity loading (areal capacity) becomes moderate (e.g., 2-4 $mAh/cm^2$) or even more so when the areal capacity becomes high (e.g., 4-10 $mAh/cm^2$). Higher capacity loading, however, is advantageous for increasing cell energy density and reducing cell manufacturing costs. Similarly, cell performance often may degrade when the porosity of such an anode (e.g., the volume occupied by the spacing between the (nano)composite active anode particles in the electrode and filled with electrolyte) becomes moderately small (e.g., 25-35 vol. % after the first charge-discharge cycle) and more so when the porosity of the anode becomes small (e.g., 5-25 vol. % after the first charge-discharge cycle) or when the amount of a binder and conductive additives in the electrode becomes moderately small (e.g., 5-15 wt. %) and more so when the amount of the binder and conductive additives in the electrode becomes small (e.g., 0.5-5 wt. %). Higher electrode density and lower binder and conductive additive content, however, are advantageous for increasing cell energy density and reducing cost. Lower binder content may also be advantageous for increasing cell rate performance.

Examples of materials that exhibit moderately high volume changes (e.g., 8-180 vol. %) during the first charge-discharge cycle and moderate volume changes (e.g., 5-50 vol. %) during the subsequent charge-discharge cycles include (nano)composites comprising so-called conversion-type (which includes both so-called chemical transformation and so-called "true conversion" sub-classes) and so-called alloying-type active electrode materials. In the case of metal-ion batteries (such as Li-ion batteries), examples of such alloying-type electrode materials include, but are not limited to, silicon, germanium, antimony, aluminum, magnesium, zinc, gallium, arsenic, phosphorous, silver, cadmium, indium, tin, lead, bismuth, their alloys, and others. In the case of metal-ion batteries (such as Li-ion batteries), examples of such conversion-type electrode materials include, but are not limited to silicon oxides, germanium oxides, antimony oxides, aluminum oxides, magnesium oxides, zinc oxides, gallium oxides, cadmium oxides, indium oxides, tin oxides, lead oxides, bismuth oxides, their alloys, and others. These materials typically offer higher gravimetric and volumetric capacity than so-called intercalation-type electrodes commonly used in commercial metal-ion (e.g., Li-ion) batteries. Alloying-type electrode materials are particularly advantageous for use in certain high-capacity anodes for Li-ion batteries. Silicon-based alloying-type anodes may be particularly attractive for such applications.

Accordingly, there remains a need for improved batteries, components, and other related materials and manufacturing processes.

SUMMARY

Embodiments disclosed herein address the above stated needs by providing improved batteries, components, and other related materials and manufacturing processes.

As an example, a metal-ion battery cell comprises an anode electrode with a capacity loading in the range of about 2 $mAh/cm^2$ to about 10 $mAh/cm^2$ and comprising anode particles that (i) have an average particle size in the range of about 0.2 microns to about 40 microns, (ii) exhibit a volume expansion in the range of about 8 vol. % to about 180 vol. % during one or more charge-discharge cycles of the battery cell, and (iii) exhibit a specific capacity in the range of about 550 mAh/g to about 2900 mAh/g. The metal-ion battery cell further comprises a cathode electrode comprising an intercalation-type active material including at least Li, one or more metals, and oxygen. The metal-ion battery cell further comprises a separator electrically separating the anode electrode and the cathode electrode, and an electrolyte ionically coupling the anode electrode and the cathode electrode. The electrolyte comprises one or more metal-ion salts and a solvent composition, the solvent composition comprising one or more low-melting point solvents that each have a melting point in the range from about −140° C. to about −60° C. and are in the range from about 10 vol. % to about 95 vol. % of the solvent composition.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

DETAILED DESCRIPTION

Figure 1:
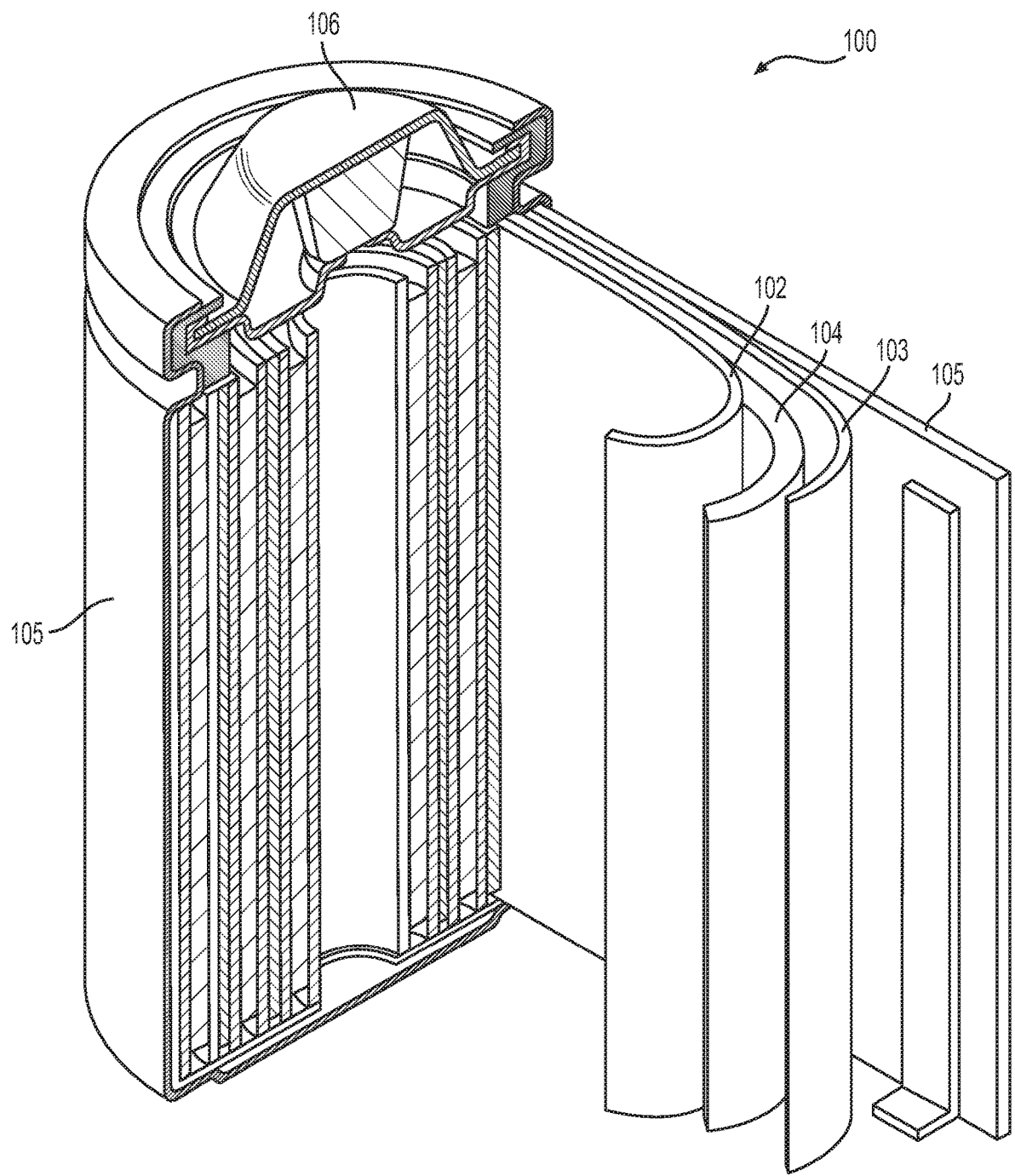
FIG. 1 illustrates an example Li-ion battery in which the components, materials, methods, and other techniques described herein may be implemented.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details. Further, the terminology of "at least partially" is intended for interpretation as "partially, substantially or completely".

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from about −120° C. to about −60° C. encompasses (in ° C.) a set of temperature ranges from about −120° C. to about −119° C., from about −119° C. to about −118° C., . . . from about −61° C. to about −60° C., as if the intervening numbers (in ° C.) between −120° C. and −60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description below may describe certain examples in the context of Li and Li-ion batteries (for brevity and convenience, and because of the current popularity of Li technology), it will be appreciated that various aspects may be applicable to other rechargeable and primary batteries (such as Na-ion, Mg-ion, K-ion, Ca-ion, and other metal and metal-ion batteries, etc.). Further, while the description below may also describe certain examples of the material formulations in a Li-free state (for example, as in silicon-comprising nanocomposite anodes), it will be appreciated that various aspects may be applicable to Li-containing electrodes (for example, partially or fully lithiated Si or silicon oxide-comprising anodes, among others).

Further, while the description below may describe certain examples in the context of some specific alloying-type and conversion-type chemistries of anode active materials for Li-ion batteries (such as Si-comprising anodes), it will be appreciated that various aspects may be applicable to other chemistries for Li-ion batteries (other conversion-type and alloying-type electrodes as well as various intercalation-type electrodes, commonly crystalline materials) as well as to other battery chemistries.

During battery (such as a Li-ion battery) operation, conversion materials change (convert) from one crystal structure to another (hence the name "conversion"-type). This process is also accompanied by breaking chemical bonds and forming new ones. During (e.g., Li-ion) battery operation, Li ions are inserted into alloying type materials forming lithium alloys (hence the name "alloying"-type). Sometimes, "alloying"-type electrode materials are considered to be a sub-class of "conversion"-type electrode materials.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (shown implicitly) impregnating the separator 104, a battery case 105, and a sealing member 106 sealing the battery case 105.

Conventional electrolytes for Li- or Na-based batteries of this type are generally composed of a 0.8-1.2 M (1M±0.2 M) solution of a single Li or Na salt (such as $LiPF_6$ for Li-ion batteries and $NaPF_6$ or $NaClO_4$ salts for Na-ion batteries) in a mixture of carbonate solvents with 1-2 wt. % of other organic additives. Common organic additives may include nitriles, esters, sulfones, sulfoxides, phosphorous-based solvents, silicon-based solvents, ethers, and others. Such additive solvents may be modified (e.g., sulfonated or fluorinated).

The conventional salt used in most conventional Li-ion battery electrolytes is $LiPF_6$. Examples of less common salts (e.g., explored primarily in research publications or, in some cases, never even described in Li-ion battery electrolyte applications, but may still be applicable and useful) include: lithium tetrafluoroborate ($LiBF_4$), lithium perchlorate ($LiClO_4$), lithium hexafluoroantimonate ($LiSbF_6$), lithium hexafluorosilicate ($Li_2SiF_6$), lithium hexafluoroaluminate ($Li_3AlF_6$), lithium bis(oxalato)borate ($LiB(C_2O_4)_2$, lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3CF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), and others.

Electrodes utilized in Li-ion batteries are typically produced by (i) formation of a slurry comprising active materials, conductive additives, binder solutions and, in some cases, surfactant or other functional additives; (ii) casting the slurry onto a metal foil (e.g., Cu foil for most anodes and Al foil for most cathodes); and (iii) drying the casted electrodes to completely evaporate the solvent.

Conventional anode materials utilized in Li-ion batteries are of an intercalation-type (e.g., graphite or lithium titanite). Metal ions are intercalated into and occupy interstitial positions of such materials during the charge or discharge of a battery. Such anodes experience small or very small volume changes when used in electrodes. Polyvinylidene fluoride, or polyvinylidene difluoride (PVDF), and carboxymethyl cellulose (CMC) are the two most common binders used in these electrodes. Carbon black is the most common conductive additive used in these electrodes. However, such anodes exhibit relatively small gravimetric and volumetric capacities (typically less than 370 mAh/g rechargeable specific capacity in the case of graphite- or hard carbon-based anodes and less than 600 mAh/cm$^3$ rechargeable volumetric capacity at the electrode level without considering the volume of the current collector foils).

Alloying-type anode materials for use in Li-ion batteries offer higher gravimetric and volumetric capacities compared to intercalation-type anodes. For example, silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. Electronic and ionic conductivity of Si is lower than that of graphite. Formation of (nano)composite Si-comprising particles (including, but not limited to Si-carbon composites, Si-metal composites, Si-polymer composites, Si-ceramic composites, composites comprising various combinations of nanostructured Si, carbon, polymer, ceramic and metal or other types of porous composites comprising nanostructured Si or nanostructured or nano-sized Si particles of various shapes and forms) may reduce volume changes during Li-ion insertion and extraction, which, in turn, may lead to better cycle stability in rechargeable Li-ion cells.

In addition to Si-comprising nanocomposite anodes, other examples of such nanocomposite anodes comprising alloying-type active materials include, but are not limited to, those that comprise germanium, antimony, aluminum, magnesium, zinc, gallium, arsenic, phosphorous, silver, cadmium, indium, tin, lead, bismuth, their alloys, and others.

In addition to (nano)composite anodes comprising alloying-type active materials, other interesting types of high capacity (nano)composite anodes may comprise metal oxides (including silicon oxide, lithium oxide, etc.), metal nitrides, metal phosphides (including lithium phosphide), metal hydrides, and others.

In particular, high-capacity (nano)composite anode powders, which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from around 0.2 to around 40 microns (more preferably from around 0.4 to around 20 microns) may be particularly attractive for battery applications in terms of manufacturability and performance characteristics. Electrodes with electrode areal capacity loading from moderate (e.g., about 2-about 4 mAh/cm$^2$) to high (e.g., about 4-about 10 mAh/cm$^2$) are also particularly attractive for use in cells. In some designs, a near-spherical (spheroidal) shape of these composite particles may additionally be very attractive for increasing rate performance and volumetric capacity of the electrodes. In spite of some improvements that may be achieved with the formation and utilization of such alloying-type or conversion-type active material(s)' comprising nanocomposite anode materials as well as electrode formulations, however, substantial additional improvements in cell performance characteristics may be achieved with the improved composition and preparation of electrolytes, beyond what is known or shown by the conventional state-of-the-art. Unfortunately, high-capacity (nano)composite anode and cathode powders, which exhibit moderately high volume changes (e.g., about 8-about 180 vol. %) during the first charge-discharge cycle, moderate volume changes (e.g., about 4-about 50 vol. %) during the subsequent charge-discharge cycles, an average size in the range from around 0.2 to around 40 microns and relatively low density (e.g., about 0.5-about 3.8 g/cc), are relatively new and their performance characteristics and limited cycle stability are typically relatively poor, particularly if electrode areal capacity loading is moderate (e.g., about 2-about 4 mAh/cm$^2$) and even more so if it is high (e.g., about 4-about 10 mAh/cm$^2$). Higher capacity loading, however, is advantageous for increasing cell energy density and reducing cell manufacturing costs. Similarly, the cell performance may suffer when such an electrode (e.g., anode) porosity (volume occupied by the spacing between the (nano)composite active anode particles in the electrode and filled with electrolyte) becomes moderately small (e.g., about 25-about 35 vol. %) and more so when it becomes small (e.g., about 5-about 25 vol. %) or when the amount of the binder and conductive additives in the electrode becomes moderately small (e.g., about 6-about 15 wt. %, total) and more so when it becomes small (e.g., about 0.5-about 5 wt. %, total). Higher electrode density and lower binder content, however, are advantageous for increasing cell energy density and reducing cost in certain applications. Lower binder content may also be advantageous for increasing cell rate performance. Larger volume changes lead to inferior performance in some designs, which may be related to damages in the solid electrolyte interphase (SEI) layer formed on the anode, to the non-uniform lithiation and de-lithiation of the electrode particles within the electrodes, and other factors.

Surprisingly, the inventors have found that electrolyte compositions that work well for intercalation-type anode and cathode electrodes (of various particle size) as well as electrolytes that show improved performance for nano-sized (e.g., in the range from about 1 nm to about 200 nm) conversion-type anode and cathode electrodes or nano-sized (typically in the range from 1 nm to 200 nm) alloying-type anodes, perform poorly in cells comprising high-capacity (nano)composite anode particles (e.g., powders), which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from around 0.2 to around 40 microns. Furthermore, electrolytes which typically perform poorly in cells with conventional nano-sized (e.g., in the range from about 1 nm to about 200 nm) alloying-type anode materials, were found to perform markedly better in cells comprising high-capacity (nano)composite anode particles (e.g., powders), which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from around 0.2 to around 40 microns. The impact of changes in the electrolyte composition on the otherwise improved cell performance with such (nano)composite anodes comprising alloying-type anode materials was found to be particularly strong for certain applications. In particular, identifying electrolyte compositions for the improved performance of a sub-class of such anode powders with specific surface area in the range from around 0.5 $m^2/g$ to around 50 $m^2/g$ was found to be particularly valuable and impactful for achieving a combination of good stability, good energy density, and other performance characteristics. In an example, for those anode materials that comprise silicon (Si), the (nano)composite electrodes with gravimetric capacities in the range from around 600 mAh/g to around 2200 mAh/g or around 2600 mAh/g (normalized by the total mass of (nano)composite particles, binders and conductive additives combined) were particularly valuable because the combination of the disclosed electrolyte compositions with such anodes allowed cells to achieve an attractive combination of good stabilities, good energy density, good rate performance, and other important and desired performance characteristics.

One or more embodiments of the present disclosure overcome some of the above-discussed challenges of various types of cells comprising nanocomposite anode materials (for example, materials comprising conversion-type and alloying-type active materials) that experience certain volume changes during cycling (for example, moderately high volume changes (e.g., about 8-about 160 or about 180 vol. %) during the first charge-discharge cycle and moderate volume changes (e.g., about 4-about 50 vol. %) during the subsequent charge-discharge cycles), an average particle size in the range from around 0.2 to around 40 microns and a specific surface area in the range from around 0.5 to around 50 $m^2/g$ for a broad range of batteries. In accordance with one or more embodiments, substantially more stable cells may be formulated with such electrodes in moderate (e.g., about 2-about 4 $mAh/cm^2$) and high capacity loadings (e.g., about 4-about 10 $mAh/cm^2$), high packing density (electrode porosity filled with electrolyte in the range from about 5 to about 35 vol. % after the first charge-discharge cycle) and relatively low binder content (e.g., about 0.5-about 14 wt. %).

Conventional cathode materials utilized in Li-ion batteries are of an intercalation-type and commonly crystalline. Such cathodes typically exhibit a highest charging potential of less than around 4.3 V vs. Li/Li+, gravimetric capacity less than 180 mAh/g (based on the mass of active material) and volumetric capacity of less than 800 $mAh/cm^3$ (based on the volume of the electrode and not counting the volume occupied by the current collector foil). For given anodes, higher energy density in Li-ion batteries may be achieved either by using higher-voltage cathodes (cathodes with a highest charging potential from around 4.35 V vs. Li/Li+ to around 5.1 V vs. Li/Li+) and/or higher capacity cathodes (e.g., cathode with a gravimetric capacity of more than about 180 mAh/g, such as between around 180 mAh/g and around 300 mAh/g based on the mass of active material). Some high capacity intercalation-type cathodes may comprise nickel (Ni). Some high capacity intercalation-type cathodes may comprise manganese (Mn). Some high capacity intercalation-type cathodes may comprise cobalt (Co). In some designs, intercalation-type cathode particles may comprise fluorine (F) in their structure or the surface layer. Some high capacity lithium nickel cobalt manganese oxide (NCM) cathodes or lithium nickel cobalt aluminum oxide (NCA) cathodes or lithium nickel aluminum oxide cathodes or lithium manganese oxide (LMO) or various mixed lithium metal oxide cathodes may be particularly attractive for automotive cells (cells used in electric vehicles or hybrid electric vehicles). Combination of such types of higher capacity (compared to conventional ones) intercalation-type cathodes with high-capacity (e.g., Si based) anodes may result in high cell-level energy density. Unfortunately, the cycle stability and other performance characteristics of such cells may not be sufficient for some applications, at least when used in combination with conventional electrolytes.

One or more embodiments of the present disclosure are thereby directed to electrolyte compositions that work well for a combination of high voltage intercalation cathodes (cathodes with the highest charging potential in the range from about 4.2 V to about 4.5 V vs. Li/Li+ and, in some cases, from about 4.5 V vs. Li/Li+ to about 5.1 V vs. Li/Li+) with a sub-class of high-capacity moderate volume changing anodes (e.g., anodes comprising (nano)composite anode powders, which exhibit moderately high volume changes (e.g., about 8-about 160 or about 180 vol. %) during the first charge-discharge cycle, moderate volume changes (e.g., about 4-about 50 vol. %) during the subsequent charge-discharge cycles, an average size (e.g., average diameter) in the range from around 0.2 to around 40 microns and specific surface area in the range from around 0.5 to around 50 $m^2/g$ normalized by the mass of the active electrode particles and, in the case of Si-comprising anodes, specific capacities in the range from around 550 to around 2200 mAh/g or 2700 mAh/g (when normalized by the total mass of the composite anode particles, conductive additives and binders) or in the range from around 650 to around 2200 mAh/g or around 2900 mAh/g (when normalized by the mass of the composite anode particles only)). In at least one embodiment, a particular electrolyte composition may be selected based on the value of the highest cathode charge potential.

Through various studies, the inventors have found that cells comprising electrodes based on high capacity nanocomposite anode particles or powders (comprising conversion- or alloying-type active materials) that experience certain volume changes during cycling (moderately high volume changes (e.g., an increase by about 8-about 160 or about 180 vol. % or a reduction by about 8-about 70 vol. %) during the first charge-discharge cycle and moderate volume changes (e.g., about 4-about 50 vol. %) during the subsequent charge-discharge cycles) and an average size in the range from around 0.2 to around 40 microns (such as Si-based nanocomposite anode powders, among many others) may benefit from specific compositions of electrolytes that provide significantly improved performance (particularly for high capacity loadings).

For example, (i) continuous volume changes in high capacity nanocomposite particles during cycling in combination with (ii) electrolyte decomposition on the electrically conductive electrode surface at electrode operating potentials (e.g., mostly electrochemical electrolyte reduction in the case of Si-based anodes) may lead to a continuous (even if relatively slow) growth of a solid electrolyte interphase (SEI) layer on the surface of the nanocomposite particles.

Swelling of binders in electrolytes depends not just on the binder composition, but may also depend on the electrolyte compositions. Furthermore, such swelling (and the resulting performance reduction) often correlates with the reduction in elastic modulus upon exposure of binders to electrolytes. In this sense, the smaller the reduction in modulus in certain electrolytes, the more stable the binder-linked (nano)composite active particles/conductive additives interface becomes. The reduction in binder modulus by over 15-20% may result in a noticeable reduction in performance. In an example, the reduction in the binder modulus by two times (2×) may result in a substantial performance reduction. In a further example, the reduction in modulus by five or more times (e.g. 5×-500×) may result in a very significant performance reduction. Therefore, selecting an electrolyte composition that does not induce significant binder swelling may be highly preferential for certain applications. In some examples, it may be preferred to select an electrolyte composition that reduces the binder modulus by less than about 30 vol. % (more preferably, by no more than about 10 vol. %) when exposed to electrolyte. In anodes which comprise more than one binder composition, it may be preferred to select an electrolyte composition where at least one binder does not reduce the modulus by over about 30 vol. % (more preferably, by no more than about 10 vol. %) when exposed to electrolyte.

The following example electrolyte compositions may be beneficial for use in Li and Li-ion cells with high capacity nanocomposite electrode particles or powders (e.g., comprising conversion- or alloying-type active anode materials) that experience certain volume changes during cycling (moderately high volume changes (e.g., an increase by about 8-about 160 or about 180 vol. % or a reduction by about 8-about 70 vol. %) during the first charge-discharge cycle and moderate volume changes (e.g., about 4-about 50 vol. %) during the subsequent charge-discharge cycles), an average size in the range from around 0.2 to around 40 microns (for some applications, more preferably from around 0.4 to around 20 microns) and specific surface area in the range from about 0.5 m²/g to about 50 m²/g. These electrolytes may comprise one or more of the following components: (a) low-melting point (LMP) solvent or solvent mixture; (b) regular melting point (RMP) solvent or solvent mixture; (c) additive (ADD) solvent or solvent mixture (added, for example, to improve anode electrolyte interphase properties or to improve cathode electrolyte interphase properties or to stabilize Li salts or to provide other useful functionality); (d) main (MN) Li salt or Li salt mixture; (e) additive (ADD) salt or salt mixture (not necessarily Li-based) (added, for example, to improve anode electrolyte interphase properties or to improve cathode electrolyte interphase properties or to stabilize Li salts or to provide other useful functionality); (f) other functional additives (OFADD) (added, for example, to enhance cell safety), where LMP solvent or LMP solvent mixture may preferably contribute to about 10-about 95 vol. % of the volume of all solvents in the electrolyte (more preferably, the LMP solvent or LMP solvent mixture may contribute to about 10-about 80 vol. % of the volume of all solvents in the electrolyte in some designs; e.g., for cells with high-capacity nanostructured anodes, a more favorable volume fraction of LMP solvents may range from about 20 vol. % to about 60 vol. %); where RMP solvent or RMP solvent mixture may preferably contribute to about 5-about 90 vol. % of the volume of all solvents in the electrolyte (more preferably, the RMP solvent or RMP solvent mixture may contribute to about 20-about 90 vol. % of the volume of all solvents in the electrolyte in some designs); and where ADD solvent or solvent mixture may preferably contribute to about 0-about 6 vol. % of the volume of all solvents in the electrolyte. Particular values of the optimum volume fractions of the LMP, RMP and ADD solvents or solvent mixtures for particular applications may depend on the cell operating potentials, cell operating (or cell storage) temperature and rates of charge and discharge desirable for cells in a given application. Examples of suitable esters for use as LMP solvent(s) or co-solvent(s) may include, but are not limited to, various formates (e.g., methyl formate, ethyl formate, propyl formate, butyl formate, amyl formate, hexyl formate, heptyl formate, etc.), various acetates (e.g., methyl acetate, ethyl acetate, propyl acetate, butyl acetate, amyl acetate, hexyl acetate, heptyl acetate, etc.), various propionates (e.g., methyl propionate, ethyl propionate, propyl propionate, butyl propionate, amyl propionate, hexyl propionate, heptyl propionate, etc.), various butyrates (e.g., methyl butyrate, ethyl butyrate, propyl butyrate, butyl butyrate, amyl butyrate, hexyl butyrate, heptyl butyrate, etc.), various valerates (e.g., methyl valerate, ethyl valerate, propyl valerate, butyl valerate, amyl valerate, hexyl valerate, heptyl valerate, etc.), various caproates (e.g., methyl caproate, ethyl caproate, propyl caproate, butyl caproate, amyl caproate, hexyl caproate, heptyl caproate, etc.), various heptanoates (e.g., methyl heptanoate, ethyl heptanoate, propyl heptanoate, butyl heptanoate, amyl heptanoate, hexyl heptanoate, heptyl heptanoate, etc.), various caprylates (e.g., methyl caprylate, ethyl caprylate, propyl caprylate, butyl caprylate, amyl caprylate, hexyl caprylate, heptyl caprylate, etc.), various nonaoates (e.g., methyl nonaoate, ethyl nonaoate, propyl nonaoate, butyl nonaoate, amyl nonaoate, hexyl nonaoate, heptyl nonaoate, etc.), various decanoates (e.g., e.g., methyl decanoate, ethyl decanoate, propyl decanoate, butyl decanoate, amyl decanoate, hexyl decanoate, heptyl decanoate, etc.), and fluorinated versions of the above-discussed esters, to name a few examples. Examples of solvents suitable for use as RMP solvents in the electrolyte (or for the fabrication of RMP solvent mixtures in the electrolyte) may comprise: various carbonates (fluorinated acyclic carbonates and propylene carbonate may be particularly advantageous for use in cells with high voltage cathodes), various sulfones (e.g., dimethyl sulfone, ethylmethyl sulfone, etc.) and various sulfoxides, various lactones, various phosphorous based solvents (e.g., dimethyl methylphosphonate, triphenyl phosphate, etc.), various silicon based solvents, various types of higher melting point esters (e.g., esters with melting points above around minus (−) 50° C.), various ethers (e.g., dioxolane, monoglyme, diglyme, triglyme, tetraglyme, and polyethylene oxide, etc.), various cyclic ester-based molecules (e.g., butyrolactones and valerolactones), various dinitriles (e.g., succinonitrile, adiponitrile, and glutaronitrile), and various ionic liquids (e.g., imidazoliums, pyrrolidiniums, piperidiniums, etc., may be particularly useful in cells comprising high voltage cathodes). RMP solvent(s) may also be (either fully or partially) fluorinated.

The most widely used (in Li-ion battery) fluorinated solvent is a fluoroethylene carbonate (FEC). It helps to form a more stable (more cross-linked compared to ethylene carbonate, EC) SEI, but its excessive use (e.g., above around 30 vol. %) may also induce cell performance reduction, particularly at elevated temperatures or/and in cells comprising high voltage cathodes operating at above around 4.2 V vs. Li/Li+. Examples of solvents suitable for use as ADD solvents in the electrolyte (or for the fabrication of ADD solvent mixture in the electrolyte) may include various carbonates (including fluorinated carbonates), various sulfones (including fluorinated ones), various sulfoxides (including fluorinated ones), various lactones (including fluorinated ones), various phosphorous-based solvents (including fluorinated ones), various silicon-based solvents (including fluorinated ones) and various ethers (including fluorinated ones), various nitriles and dinitriles, among others. Nitriles and dinitriles typically suffer from unfavorable SEI formation on the anode, but in small quantities (e.g., typically below 10 vol. %, more typically below 5 vol. %) their applications in the electrolyte mix may improve electrolyte conductivity and cell performance, particularly where high voltage cathodes are utilized. In some cases (e.g., when high (e.g., above 20 vol. %) content of so-called "SEI formers" are utilized in electrolyte), nitriles and dinitriles may also be components of a LMP solvent mixture.

As used herein, LMP refers to a melting point (of a solvent or a solvent mixture) in the range from about minus (−) 140° C. to about minus (−) 60° C. As used herein RMP, refers to a melting point (of a solvent or a solvent mixture) in the range from about minus (−) 60° C. to about plus (+) 20° C.

In the present disclosure, additional discussion is provided below with respect to cells with the same type of high capacity nanocomposite anode particles or powders (e.g., with the same type/class of high capacity nanocomposite anode powders in the anode) as those described above. In particular, cells comprising NCM cathodes are discussed in detail below, although automotive cells with other cathodes (e.g., NCA, LMO, a mixture of NCM, NCA and/or LMO, etc.) may also benefit from the certain aspects of this disclosure.

In some designs, various cyclic or linear esters (e.g., γ-valerolactone, γ-methylene-γ-butyrolactone, γ-hexalactone, α-*angelica* lactone, α-methylene-γ-butyrolactone, ε-caprolactone, 5,6-dihydro-2H-pyran-2-one, γ-butyrolactone, δ-hexalactone, α-methyl-γ-butyrolactone, phthalide, γ-caprolactone, ethyl propionate, propyl acetate, methyl formate, ethyl acetate, propyl propionate, methyl propionate, ethyl propionate, methyl valerate, methyl butyrate, ethyl butyrate, butyl valerate, butyl butyrate, propyl propionate, etc.), (in some designs—without functional groups and in some designs with additional functional groups (e.g., halogens, alcohols, alkanes, alkenes, alkynes, ketones, aldehydes, ethers, amines, amides, imides, nitriles, sulfonyls, carboxylic acids, phosphates, etc.)), various cyclic or linear ethers (e.g., tetrahydrofuran, tetrahydropyran, furan, 4-methylpyran, pyran, 12-crown-4, 15-crown-5, 18-crown-6, 4-methyl-1,3-dioxane, dimethyl ether, methyl t-butyl ether, diethyl ether, methoxyethane, dioxane, dioxolane, monoglyme, diglyme, triglyme, tetraglyme, etc.), with or without additional functional groups (e.g., halogens, alcohols, alkanes, alkenes, alkynes, ketones, aldehydes, ethers, amines, amides, imides, nitriles, sulfonyls, carboxylic acids, phosphates, etc.), various anhydrides (e.g., glutaric anhydride, succinic anhydride, maleic anhydride, phthalic anhydride, cyclobutane-1,2,3,4-tetracarboxylic dianhydride, butyric anhydride, isobutyric anhydride, etc.), with or without additional functional groups (e.g., halogens, alcohols, alkanes, alkenes, alkynes, ketones, aldehydes, ethers, amines, amides, imides, nitriles, sulfonyls, carboxylic acids, phosphates, etc.), may be advantageously utilized as LMP solvents or co-solvents in the LMP mix.

In some designs, it may be advantageous to have a total salt concentration in the electrolyte in the range from around 0.8M to around 2.0M (preferably, in the range from around 1.0M to around 1.8M), while utilizing a mixture of two or more salts. It may be further advantageous in some designs for at least one of the salts to comprise $LiPF_6$. In some designs, a non-$LiPF_6$ salt may be LiFSI salt. Furthermore, in the case of the electrolyte comprising both $LiPF_6$ salt and LiFSI salt, the ratio of the molar fractions of $LiPF_6$ and LiFSI salts may preferably be in the range from around 20:1 to around 2:1. The exact optimal ratio for particular applications may depend on the electrode characteristics (e.g., thickness, amount of binder, density, anode and cathode composition and capacity, etc.), electrolyte solvent mix utilized and/or cycling regime (e.g., temperature, cell voltage range, etc.). It may further be advantageous in certain applications for the electrolyte solvent to comprise a mixture of LMP and RMP solvents and (optionally) ADD solvents. In some designs, it may also be advantageous for the LMP solvent or solvent mix to comprise ester(s).

Figure 2A:
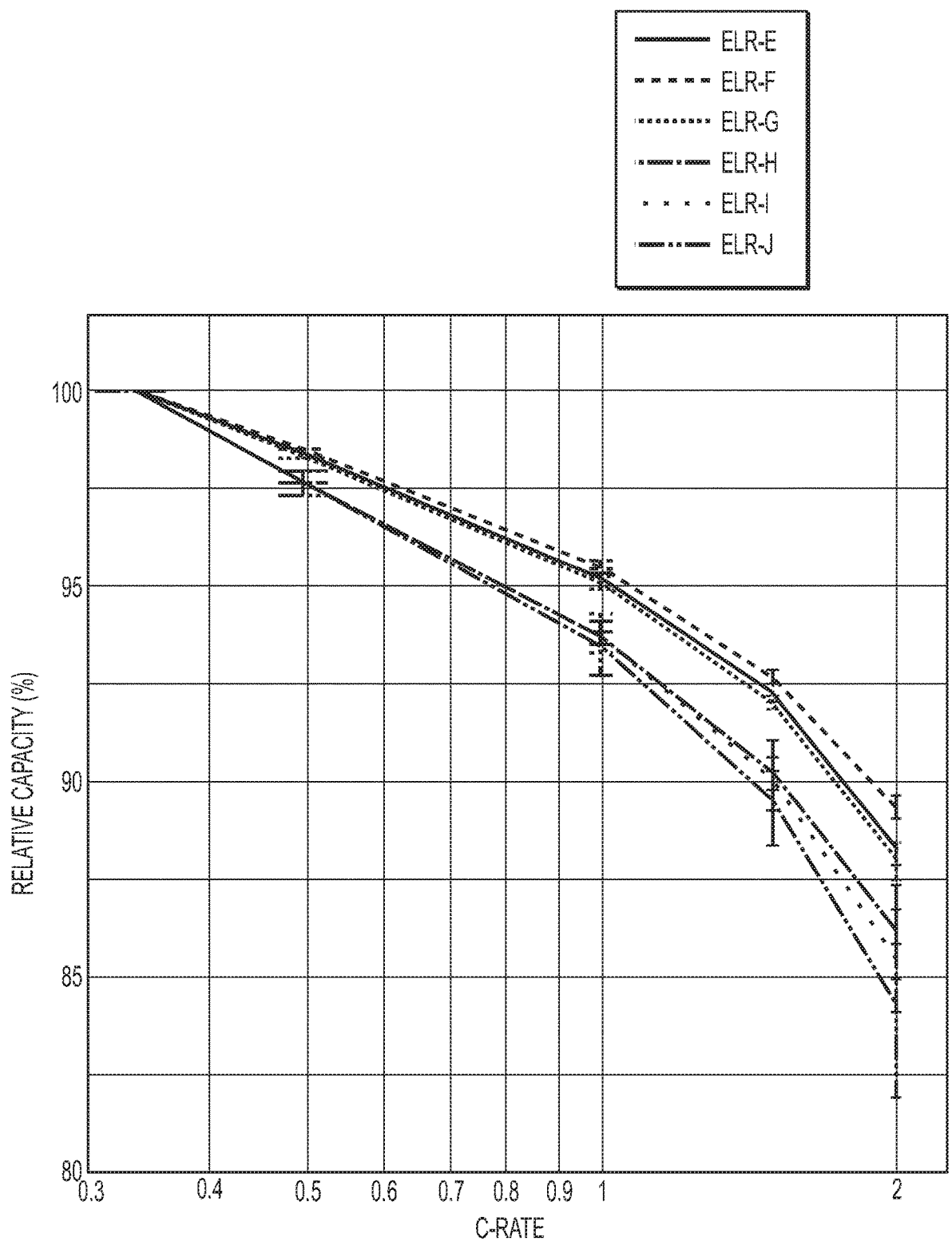
FIGS. 2A-2C, 3A-3C, 4A-4C, 5A-5C, 6A-6C, and 7 illustrate impacts of example electrolyte compositions on the performance characteristics of full cells with (nano)composite anodes exhibiting high capacity and moderately high volume changes during the first charge-discharge cycle and moderate volume changes during the subsequent charge-discharge cycles.
Figure 2B:
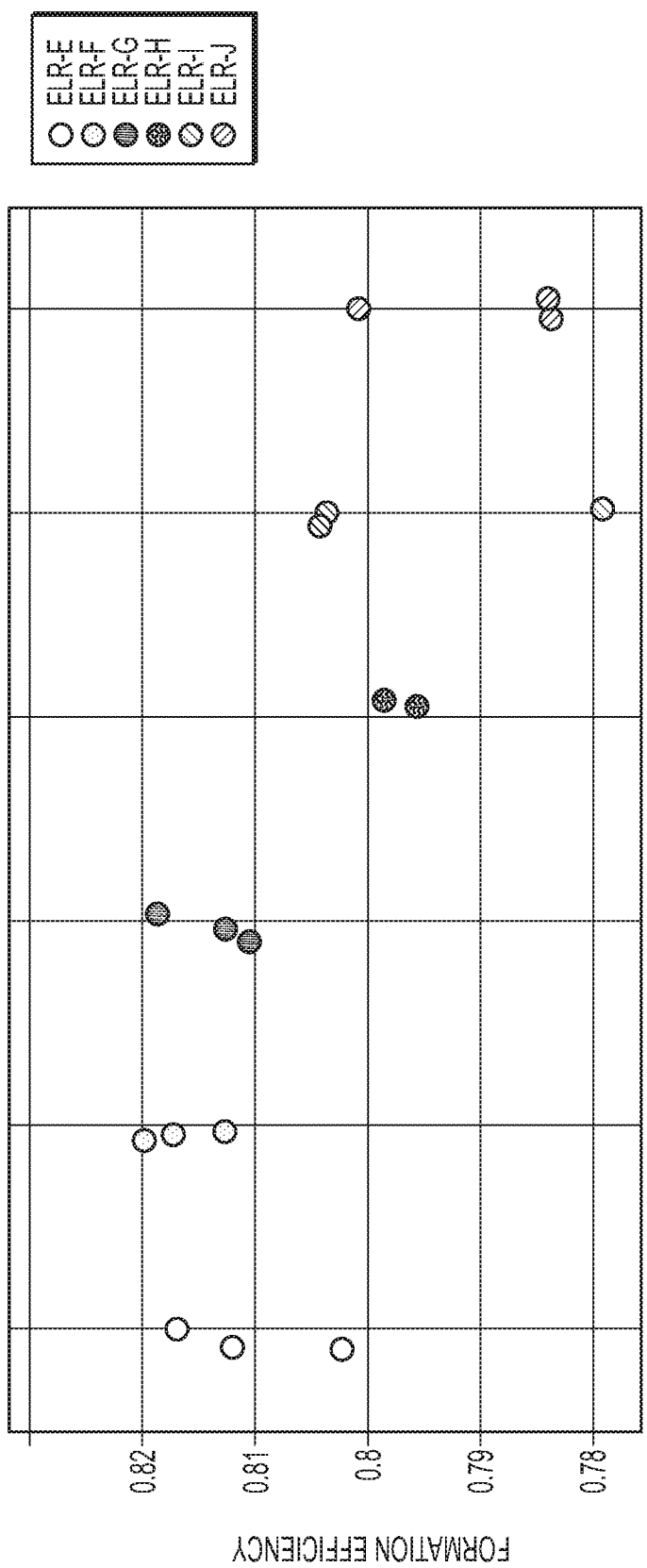
Figure 2C:
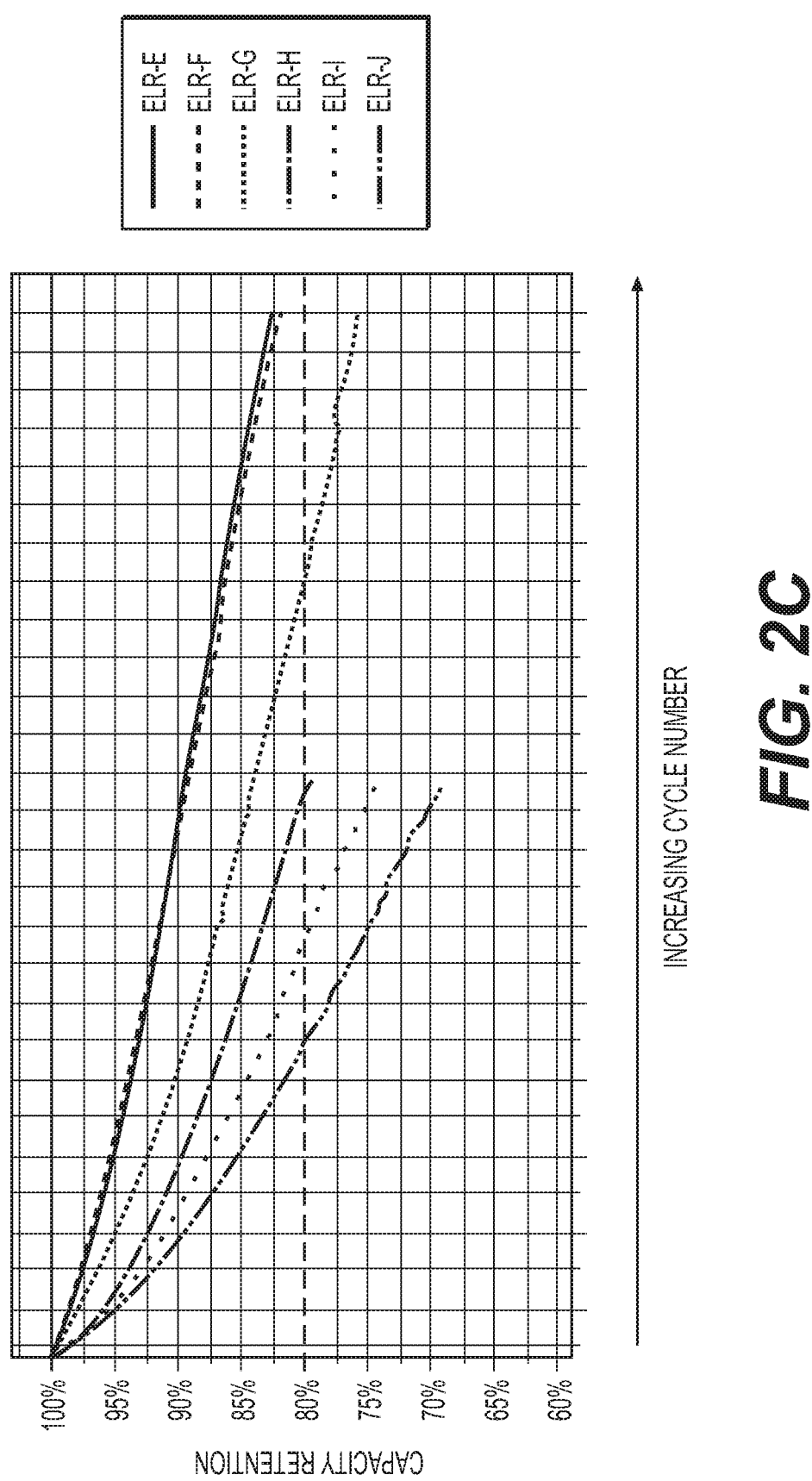

FIGS. 2A-2C illustrate the impact of example electrolyte compositions on the performance of cells comprising a powder-based high capacity, Si-comprising nanocomposite anode and an intercalation-type cathode (an NCM, in this example) and cycled in the voltage range from 2.5 to 4.4 V. In spite of the high maximum voltage, cells comprising significant amount of LMP co-solvents performed unexpectedly well. Cycle stability was studied in several example cells cycled at "C/2" rate at 45° C. Two-to-three (2-3) near-identical cells were constructed and tested for consistency. In these examples, all electrolytes comprise the same solvents (mixture of a linear carbonate (with melting point of about −15° C.), cyclic carbonates (with melting point of about +20° C.) and an ester (with melting point below −90° C.) mixed at the ratios of 20 vol. %:22 vol. %:58 vol. %, respectively). The molar amounts of the $LiPF_6$ and LiFSI salts are as follows: electrolyte ELR-E comprise 1M $LiPF_6$ and 0.2M LiFSI (1.2 M total salt concentration); electrolyte ELR-F comprise 1M $LiPF_6$ and 0.4M LiFSI (1.4 M total salt concentration); electrolyte ELR-G comprise 0.6M $LiPF_6$ and 0.6M LiFSI (1.2 M total salt concentration); electrolyte ELR-H comprise 0.4M $LiPF_6$ and 1M LiFSI (1.4 M total salt concentration); electrolyte ELR-I comprise 0.2M $LiPF_6$ and 1M LiFSI (1.2 M total salt concentration); electrolyte ELR-J comprise 0M $LiPF_6$ and 1.2M LiFSI (1.2 M total salt concentration). FIG. 2A illustrates a noticeable reduction of the cell rate performance for electrolytes ELR-H, ELR-I and ELR-J. The performance reduces with reducing fraction of the $LiPF_6$ in the $LiPF_6$:LiFSI mixture in electrolytes. Note, however, that rate performance is slightly superior for electrolyte ELR-F (1M $LiPF_6$ and 0.4M LiFSI than for electrolyte ELR-E (1M $LiPF_6$ and 0.2M LiFSI), showing benefits of slightly higher total salt concentration and also that for moderate LiFSI content, its higher fraction may not necessarily be detrimental in some applications. FIG. 2B illustrates a noticeable reduction of the formation efficiency (which includes losses in reversible capacity for the first 5 cycles and also losses in accessible capacity with increasing the cycling rate from about C/10 to about C/2) for electrolytes ELR-H, ELR-I and ELR-J. FIG. 2B illustrates similar cycle stability (number of cycles to retention to 80% of the initial capacity) of cells with electrolytes ELR-E and ELR-F and a gradual reduction of cells with electrolytes ELR-G, ELR-H, ELR-I and ELR-J, respectively.

In some designs, it may be advantageous to have a total salt concentration in the electrolyte in the range from around 0.8M to around 2.0M (preferably, in the range from around 1.0M to around 1.8M), while utilizing a small fraction of at least one at least partially fluorinated solvent (for example, as a component of the RMP solvents) in the electrolyte mixture in the range from around 1 to around 30 vol. %, as a fraction of all the solvents in the electrolyte (in some designs, from around 3 vol. % to around 20 vol. %). It may be further advantageous for the electrolyte solvent mixture to comprise both linear and cyclic molecules. In an example, it may be advantageous for at least one of the cyclic molecules to comprise fluorine atoms. In some designs, it may be preferred for the electrolyte to comprise a fluoro-ethylene carbonate (FEC) co-solvent in electrolyte (e.g., in the range from around 1 to around 30 vol. %, as a fraction of all the solvents in the electrolyte). It may further be advantageous for the electrolyte solvent to comprise a mixture of LMP and RMP solvents and (optionally) ADD solvents. In some designs, it may also be advantageous for the LMP solvent or solvent mix to comprise ester(s). In some designs, it may also be advantageous for at least one of the solvents in the LMP solvent or solvent mix to be at least partially fluorinated. In some designs, it may also be advantageous for the electrolyte to comprise other cyclic carbonates in addition to FEC (e.g., as other components of the RMP solvents). In some designs, it may be advantageous for the other cyclic carbonates to comprise ethylene carbonate (EC) with the melting point of about +34-37° C. or another cyclic carbonate with a high melting point (e.g., above +25° C.). Furthermore, in an example, the vol. ratio of FEC to other cyclic carbonates may preferably be in the range from about 4:1 to about 1:40. In an example, the exact optimal ratio may depend on the electrode characteristics (e.g., thickness, amount of binder, density, anode and cathode composition and capacity, etc.), electrolyte solvent mix utilized and/or cell cycling regime (temperature, voltage range, etc.).

Figure 3A:
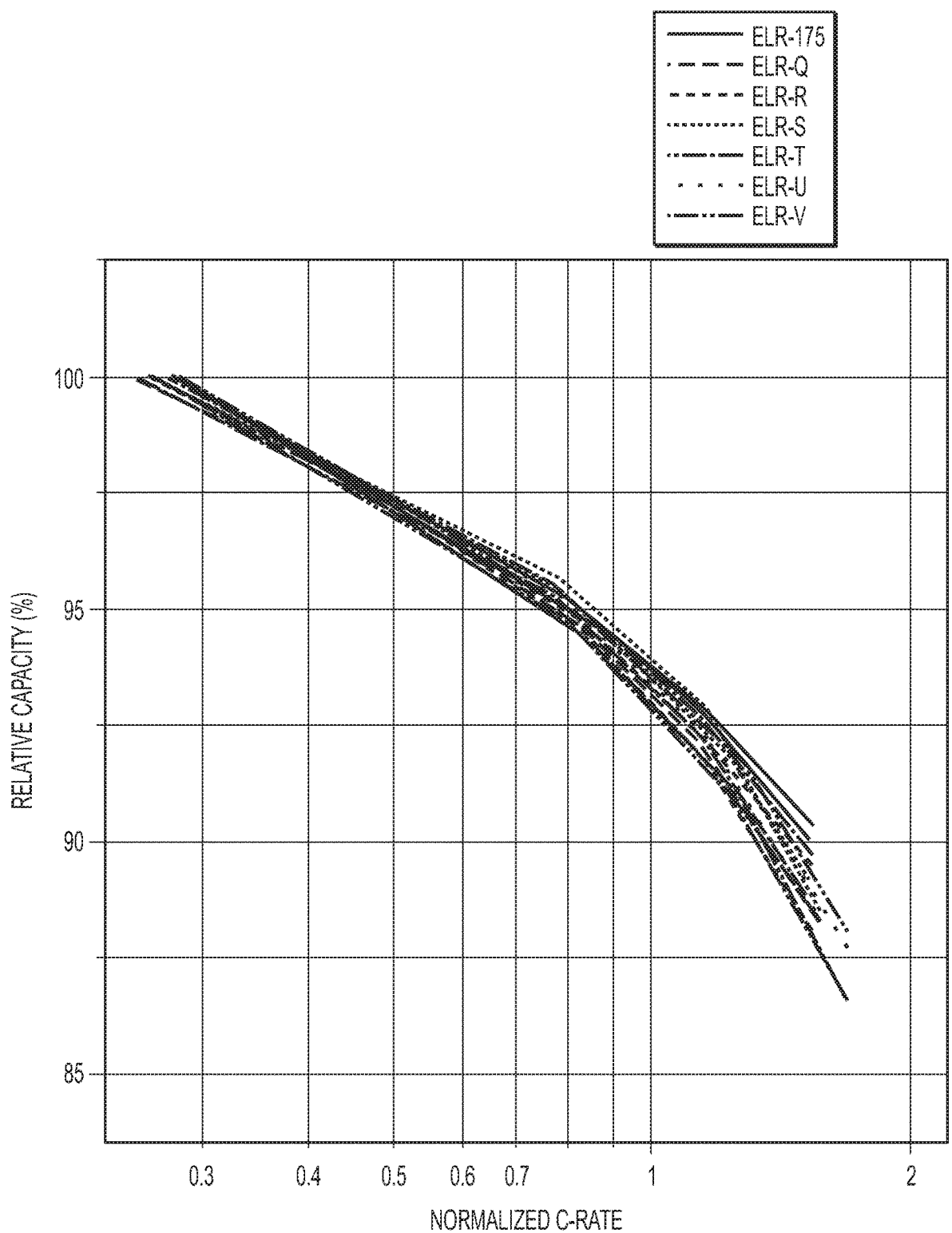
Figure 3B:
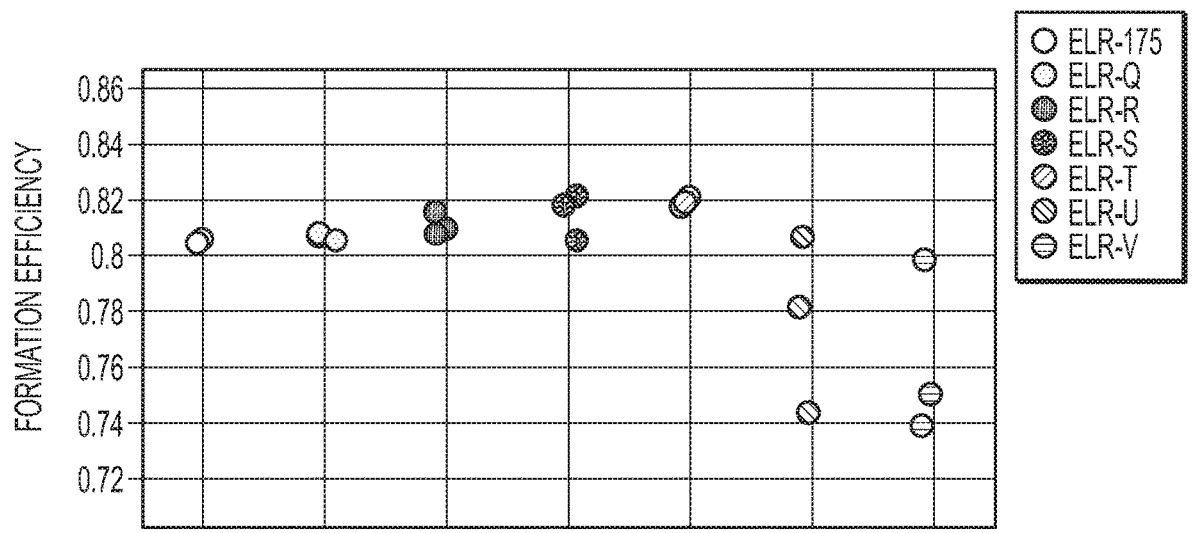
Figure 3C:
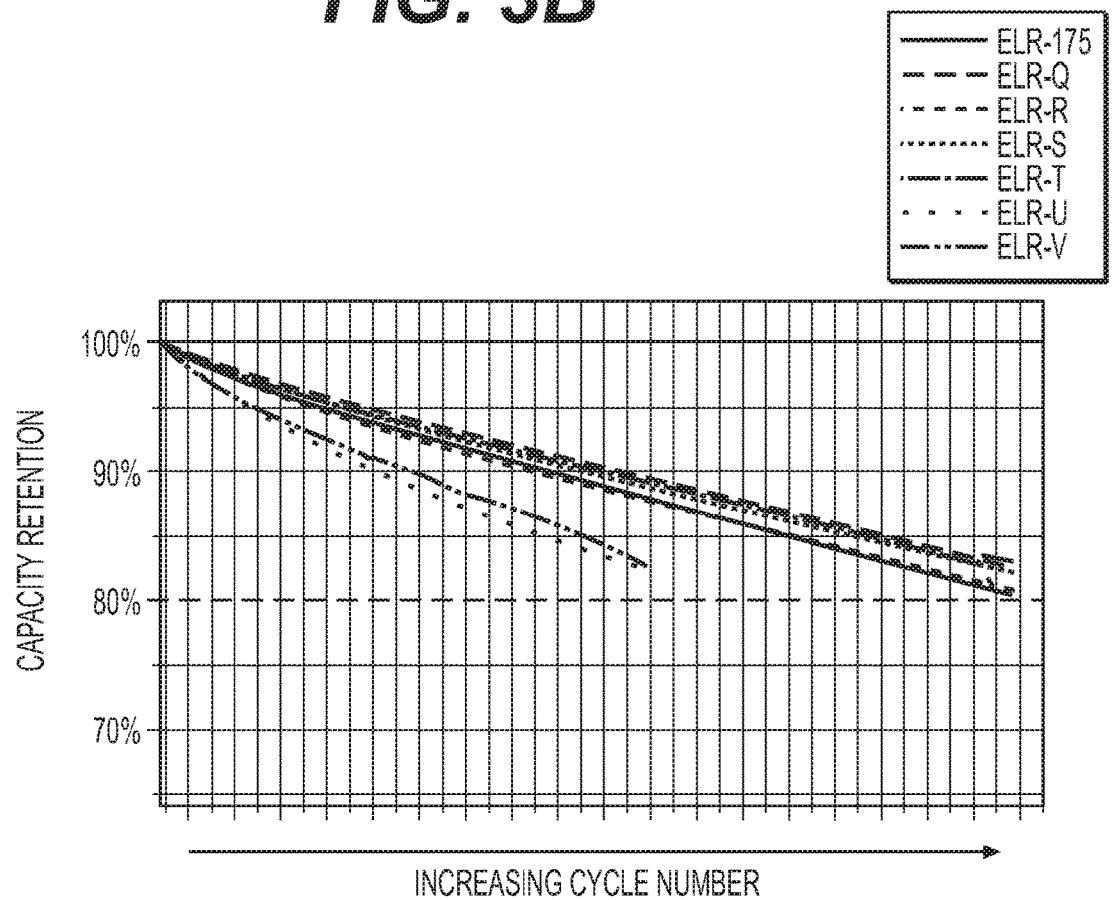

FIGS. 3A-3C illustrate the impact of other example electrolyte compositions on the performance of cells comprising a powder-based high capacity, Si-comprising nanocomposite anode and powder-based intercalation-type cathode (NCM, in this example) and cycled in the voltage range from 2.5 to 4.4 V (it will be appreciated that the cathode potential may approach or exceed about 4.5V vs Li/Li+ in this cell). Cycle stability was studied in several example cells cycled at "C/2" rate at 45° C. Two-to-three (2-3) near-identical cells were constructed and tested for consistency. In these examples, all electrolytes comprise the same salt ($LiPF_6$) in the amount of 1.2M, the same ester with a melting point below −90° C. in the amount of 48 vol. % (as a fraction of the total solvent volume), the same amount of the same ADD cyclic carbonate solvent in the amount of 2 vol. %, the same amount of the same linear carbonate in the amount of 20 vol. % and variable amounts of FEC (in the range from 0 to 30 vol. %) and variable amounts of another cyclic carbonate having a high melting point of above +25° C. (in the range from 0 to 30 vol. %). Electrolyte ELR-Q comprises 30 vol. % FEC and no other cyclic carbonate solvents (except the ADD solvent in the amount of 2 vol. %). Electrolyte ELR-R comprises 20 vol. % FEC and 10 vol. % of another cyclic carbonate solvent (in addition to the ADD solvent in the amount of 2 vol. %). Electrolyte ELR-S comprises 10 vol. % FEC and 20 vol. % of another cyclic carbonate solvent (in addition to the ADD solvent in the amount of 2 vol. %). Electrolyte ELR-T comprises 7 vol. % FEC and 23 vol. % of another cyclic carbonate solvent (in addition to the ADD solvent in the amount of 2 vol. %). Electrolyte ELR-U comprises 5 vol. % FEC and 25 vol. % of another cyclic carbonate solvent (in addition to the ADD solvent in the amount of 2 vol. %). Electrolyte ELR-V comprises 0 vol. % FEC and 30 vol. % of another cyclic carbonate solvent (in addition to the ADD solvent in the amount of 2 vol. %). FIG. 3A illustrates no noticeable reduction of excellent cell rate performance with increasing FEC content. FIG. 3B illustrates small, but noticeable increase in the formation efficiency of the cells having FEC content in the electrolyte reduced from 30 vol. % to 7 vol. % (see cells with electrolytes ELR-Q, ELR-R, ELR-S, ELR-T). However, in this example (with NCM cathode and with cell cycled to 4.4V) the reduction of FEC content to 5 vol. % and all the way to 0 vol. % noticeably reduced formation efficiency (cells with ELR-U and ELR-V electrolytes). FIG. 3C illustrates the impact of FEC content on cycle stability (capacity retention with cycling), where cells comprising electrolytes ELR-U and ELR-V show noticeable reduction in stability.

In some designs, it may be advantageous to have a total salt concentration in the electrolyte in the range from around 0.8M to around 2.0M (preferably, in the range from around 1.0M to around 1.8M), while utilizing a small fraction of fluorine-containing cyclic carbonate(s) (e.g., fluoroethylene carbonate (FEC)) as co-solvent(s) in electrolyte (e.g., in the range from around 3 to about 20 vol. %, as a fraction of all the solvents in the electrolyte), other (e.g., fluorine-free) cyclic carbonates with a melting point in the range from around minus (−) 10° C. to around minus (−) 60° C. and linear (e.g., fluorine-containing or fluorine-free) carbonates. In some designs, it may be advantageous for at least some of the carbonates (e.g., cyclic carbonates) to comprise double-bonded oxygen (=O, carbonyl group) in their molecular structure. In some designs, it may be also advantageous for the carbonates (e.g., cyclic carbonates) to comprise at least one methyl side group (−$CH_3$) in their structure. In some designs, it may also be advantageous for a propylene carbonate (PC) having a melting point of about minus (−) 49° C. to be at least one of the cyclic carbonates (e.g., as components of the RMP solvents) in the electrolyte mix. The amount of PC may preferably be in the range from about 0 to about 40 vol. %. In some designs, the amount of PC may advantageously range from around 10 vol. % to around 35 vol. %. It may also be advantageous for the electrolyte to comprise a mixture of 2-5 cyclic carbonates with different melting points in addition to FEC or in addition to FEC and PC mixture. It may further be advantageous for the electrolyte solvent to comprise a mixture of LMP and RMP solvents and (optionally) ADD solvents. In some designs, it may also be advantageous for the LMP solvent or solvent mix to comprise ester(s). In some designs, at least some of the LMP solvent(s) may be at least partially fluorinated. In some designs, it may be advantageous for the ADD solvents to comprise a small amount (e.g., about 0.1-about 5 vol. %; in some designs from about 1 to about 3 vol. %) of vinylene carbonate (VC) or vinyl ethylene carbonate (VEC) cyclic carbonates (in some designs, the use of VC may be preferred). In some designs, it may be advantageous for all the ADD solvents to contribute to about 1 vol. % to about 6 vol. % of all the solvents in the electrolyte. In some designs, it may be advantageous for the ADD solvents in electrolyte formulations to comprise small amount (e.g., from about 0.1 vol. % to about 6 vol. %; in some designs from about 0.1 vol. % to about 4 vol. % of all the solvents in the electrolyte) of trimethylsilyl polyphosphate (P1), tris(trimethylsilyl)phosphite (P2), lithium bis (oxalate)borate (LiBOB), diFEC, cyclobutane-1,2,3,4-tetracarboxylic dianhydride (A1), various organosilicons, various fluoroethers, or their combinations. In some designs, it may be advantageous for such solvents to be used in combination with VC or VEC solvents as ADD solvent components. If organosilicon is used in the electrolyte formulations (e.g., as ADD solvent), it may be advantageous for this solvent to exhibit a melting (freezing) point in the range from about minus (−) 100° C. to about-40° C. (in some designs, from about −65° C. to about −50° C.), density in the range from about 0.9 to about 1.1 g/cc (at +20° C.), dielectric constant in the range from about 5 to about 50 (in some designs, from about 10 to about 30) and boiling point (vaporization temperature at atmospheric pressure) in the range from about +100 to about +300° C. (in some designs, from about +180° C. to about 230° C.). In some designs, organosilicon molecules may advantageously comprise from about 2 to about 12 carbon atoms per molecule. It may be further advantageous for the total amount of all cyclic solvents in the electrolyte mixture to be in the range from about 10 to about 45 vol. %. It may be further advantageous for the total amount of cyclic carbonates in the electrolyte mixture to be in the range from about 15 to about 35 vol. %. In some applications, higher amount of cyclic solvents is commonly detrimental to capacity retention at high cycling C-rates or performance at low temperatures and, in some case, even to the cycle stability.

Figure 4A:
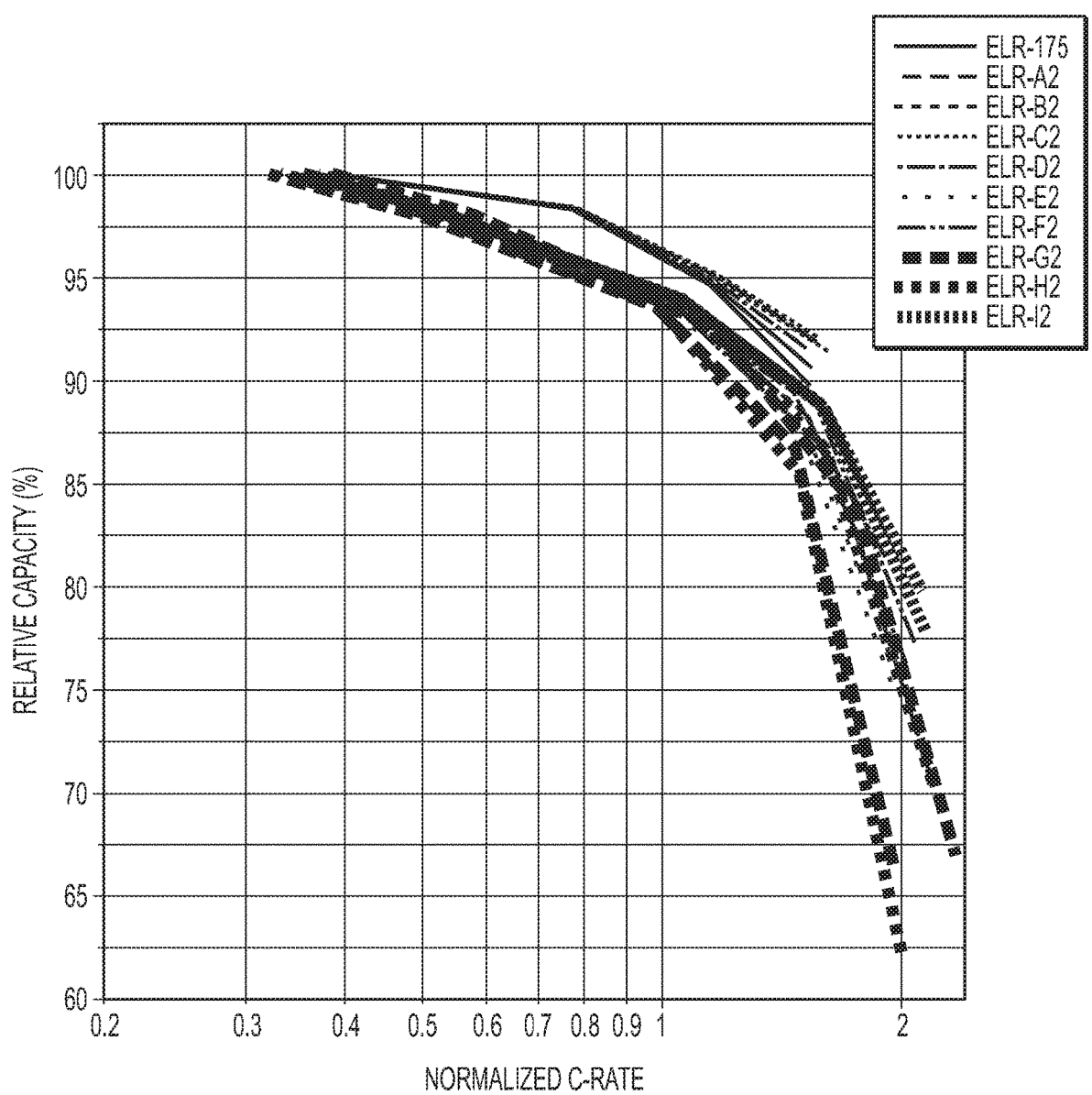
Figure 4B:
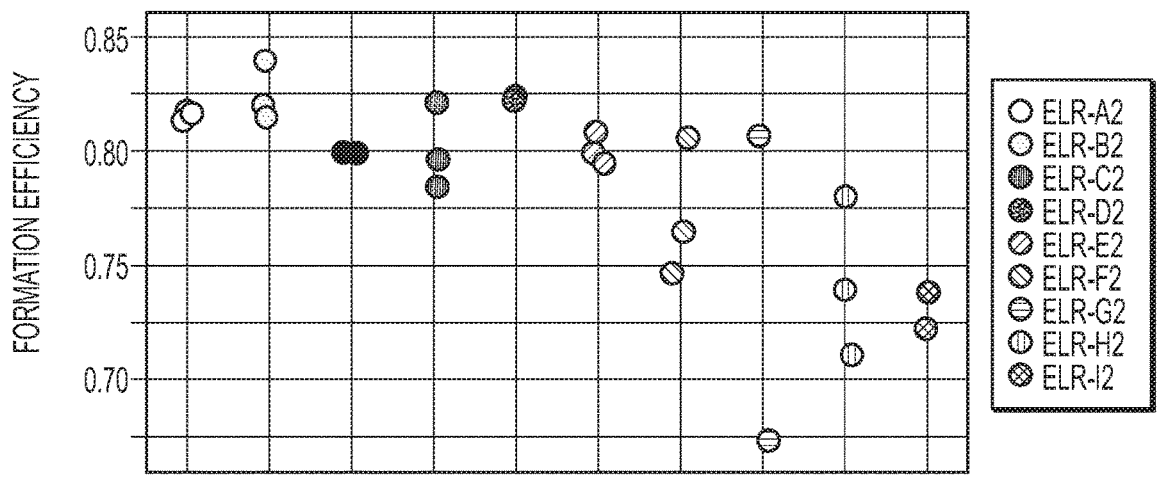
Figure 4C:
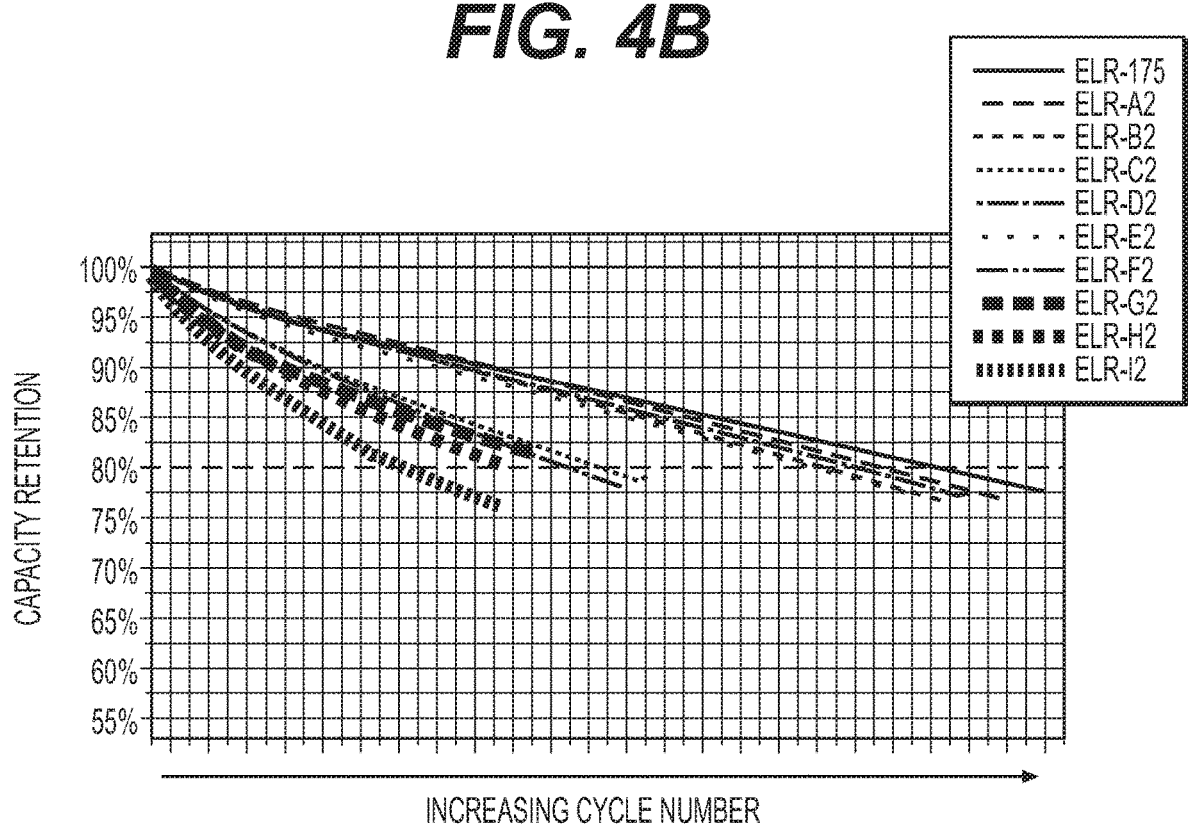

FIGS. 4A-4C illustrate the impact of other example electrolyte compositions on the performance of cells comprising a powder-based high capacity, Si-comprising nanocomposite anode and powder-based intercalation-type cathode (NCM, in this example) and cycled in the voltage range from 2.5 to 4.4 V (it will be appreciated that the cathode potential may approach or exceed about 4.5V vs Li/Li+ in this cell). Cycle stability was studied in several example cells cycled at "C/2" rate at 45° C. Two-to-three (2-3) near-identical cells were constructed and tested for consistency. In these examples, all electrolytes comprise 1M LiPF$_6$ and 0.2M LiFSI salts, 7 vol. % FEC, 20 vol. % linear carbonate, 2 vol. % cyclic carbonate ADD solvents, variable (28-to-48 vol. %) of the same linear ester with melting point below −90° C. and 23 vol. % of the non-FEC cyclic carbonates. Electrolytes ELR-A2, ELR-B2 and ELR-C2 comprise 30 vol. % of cyclic carbonates (including 7 vol. % FEC, but excluding 2 vol. % cyclic carbonate ADD solvent). ELR-A2 comprises 23 vol. % PC, 0 vol. % EC and 7 vol. % FEC. ELR-B2 comprises 11.5 vol. % PC, 11.5 vol. % EC and 7 vol. % FEC. ELR-C2 comprises 0 vol. % PC, 23 vol. % EC and 7 vol. % FEC. Electrolytes ELR-D2, ELR-E2 and ELR-F2 comprise 40 vol. % of cyclic carbonates (incl. 7 vol. % FEC, but excluding 2 vol. % cyclic carbonate ADD solvent). ELR-D2 comprises 33 vol. % PC, 0 vol. % EC and 7 vol. % FEC. ELR-E2 comprises 16.5 vol. % PC, 16.5 vol. % EC and 7 vol. % FEC. ELR-F2 comprises 0 vol. % PC, 33 vol. % EC and 7 vol. % FEC. Electrolytes ELR-G2, ELR-H2 and ELR-I2 comprise 50 vol. % of cyclic carbonates (incl. 7 vol. % FEC, but excluding 2 vol. % cyclic carbonate ADD solvent). ELR-G2 comprises 43 vol. % PC, 0 vol. % EC and 7 vol. % FEC. ELR-H2 comprises 21.5 vol. % PC, 12.5 vol. % EC and 7 vol. % FEC. ELR-I2 comprises 0 vol. % PC, 43 vol. % EC and 7 vol. % FEC. Electrolytes with PC solvents demonstrate better cycle life performance than those with EC solvents in this example. FIG. 4A shows better rate performance of cells with electrolytes ELR-A2, ELR-B2, ELR-C2 and ELR-D2. Cells based on electrolytes with higher vol. % of cyclic carbonates or where PC is at least partially replaced with EC content typically demonstrate inferior rate characteristics. FIG. 4B shows better formation efficiency of electrolytes ELR-A2, ELR-B2, ELR-C2, ELR-D2 and ELR-E2. Cells based on electrolytes with 50 vol. % of cyclic carbonates or with 40 vol. % of cyclic carbonates and no PC in the mixture show reduced formation efficiency. FIG. 4C shows better cycle stability of cells with electrolytes ELR-A2, ELR-B2, ELR-C2 and ELR-D2. Cells based on electrolytes with 50 vol. % of cyclic carbonates or with 40 vol. % of cyclic carbonates and no PC in the mixture show inferior performance. The worst cycle stability was observed in a cell with ELR-I2 electrolyte, which comprises 43 vol. % EC and 7 vol. % FEC.

In some designs, it may be advantageous to have a total salt concentration in the electrolyte in the range from around 0.8M to around 2.0M, while utilizing a small fraction of fluoroethylene carbonate (FEC) co-solvent in electrolyte (e.g., in the range from around 3 to about 20 vol. %, as a fraction of all the solvents in the electrolyte), some amount of non-FEC cyclic carbonates (e.g., in the range from around 5 to about 35 vol. %, as a fraction of all the solvents in the electrolyte) and some amount of the LMP co-solvent(s) (e.g., in the range from around 20 to about 70 vol. %, as a volume fraction of all the solvents in the electrolyte). In some designs, it may be advantageous to for the electrolyte composition to additionally comprise at least one linear carbonate. In some designs, it may be advantageous for the electrolyte to comprise a mixture of two or more linear carbonates. In some designs, it may be advantageous for the fraction of linear carbonate(s) to constitute from about 5 vol. % to about 50 vol. % (as a volume fraction of all the solvents in the electrolyte). In some designs, it may be even more advantageous for the fraction of linear carbonate(s) to constitute from about 10 vol. % to about 30 vol. % (as a volume fraction of all the solvents in the electrolyte). In some designs, it may be advantageous for at least some of the linear carbonates to comprise at least one carbonyl (=O) side group in their molecular structure. In some designs, it may be preferable for at least one of the linear carbonates or the only linear carbonate or the mixture of all linear carbonates in the electrolyte to exhibit a melting point from around −10° C. to around −60° C. The size of the linear carbonate molecules may play a significant role in cell performance. For example, shorter chain linear carbonates in the electrolyte may result in better rate performance and, in some cases, better cycle stability. However, too short linear carbonates may also lead to cycle stability reduction. In some designs, the average number of atoms in the linear carbonates in the electrolyte may preferably be in the range from about 12 to about 26 per carbonate molecule. In some designs, it may be advantageous for the electrolyte to comprise diethyl carbonate (DEC) as a linear carbonate or a component of a linear carbonate mixture. DEC-comprising electrolytes may exhibit better rate performance (better capacity retention at higher rates). Additionally, electrolytes comprising DEC may offer high cycle stability.

Figure 5A:
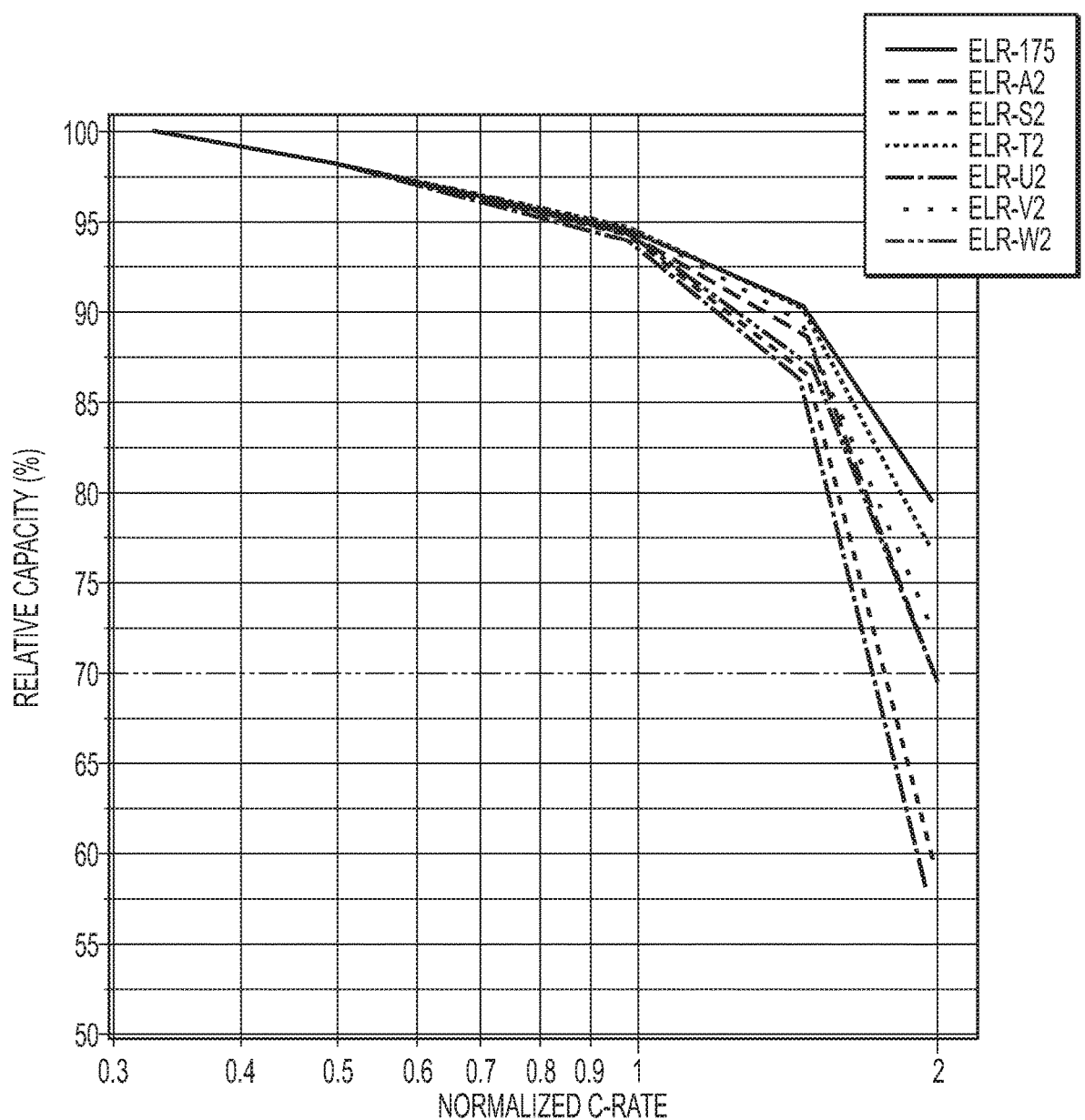
Figure 5B:
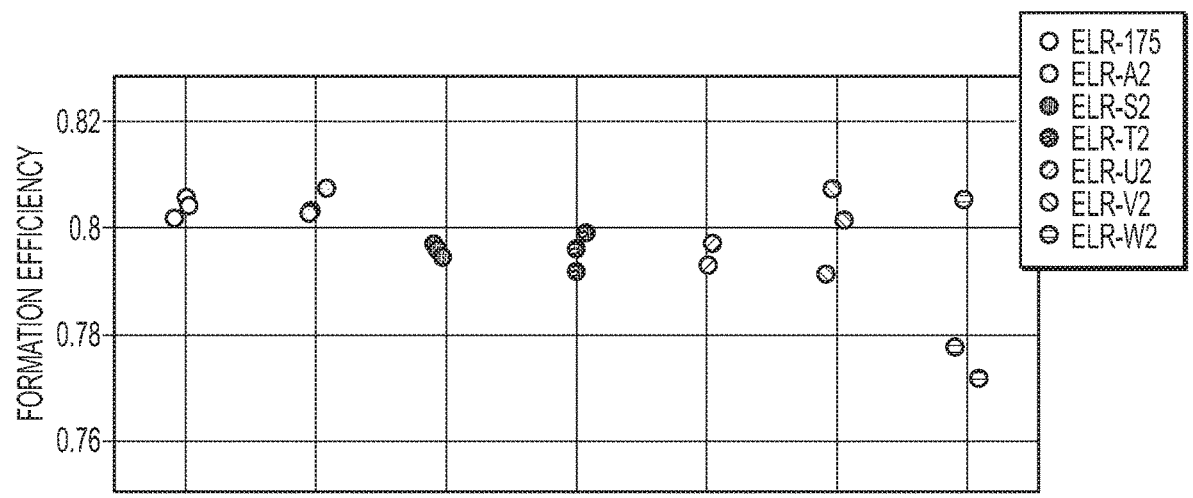
Figure 5C:
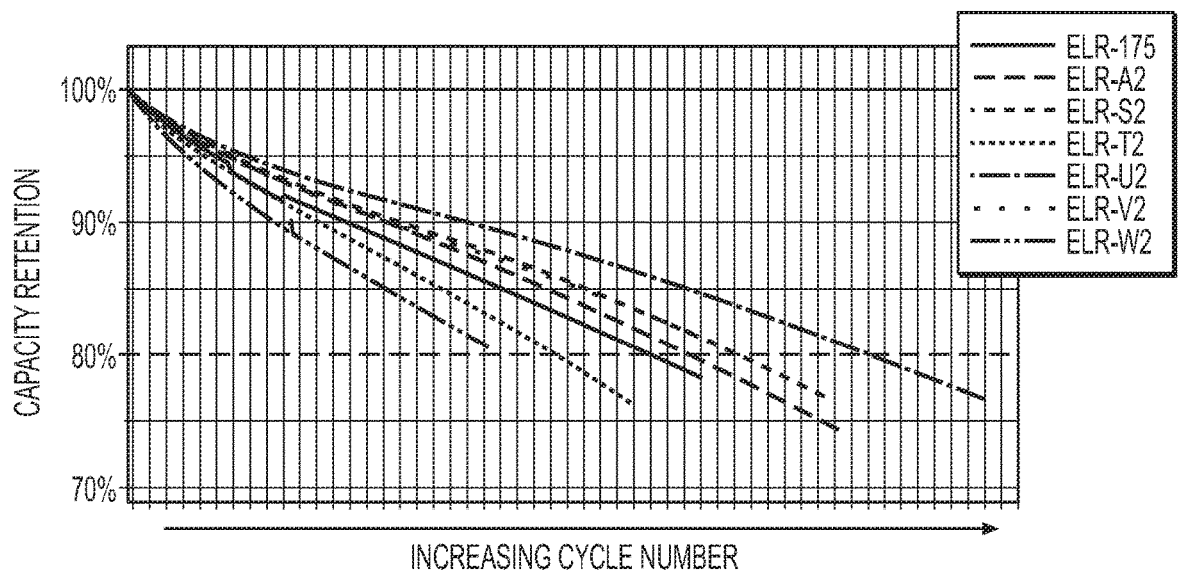

FIGS. 5A-5C illustrate the impact of other example electrolyte compositions on the performance of cells comprising a powder-based high capacity, Si-comprising nanocomposite anode and powder-based intercalation-type cathode (NCM, in this example) and cycled in the voltage range from 2.5 to 4.4 V (it will be appreciated that the cathode potential may approach or exceed about 4.5V vs Li/Li+ in this cell). Cycle stability was studied in several example cells cycled at "C/2" rate at 45° C. Two-to-three (2-3) near-identical cells were constructed and tested for consistency. In these examples, all electrolytes comprise 1M LiPF$_6$ and 0.2M LiFSI salts, 7 vol. % FEC, 20 vol. % linear carbonate(s), 2 vol. % cyclic carbonate as an ADD solvent, 48 vol. % of the same ester of FIG. 2 (with melting point below −90° C.) and 23 vol. % of identical non-FEC cyclic carbonate. Electrolyte ELR-A2 comprises 20 vol. % EMC as a linear carbonate component. Electrolyte ELR-S2 comprises 20 vol. % DEC as a linear carbonate component. Electrolyte ELR-T2 comprises 20 vol. % DMC as a linear carbonate component. Electrolyte ELR-U2 comprises 10 vol. % EMC and 10 vol. % DEC as linear carbonate components. Electrolyte ELR-V2 comprises 10 vol. % EMC and 10 vol. % DMC as linear carbonate components. Electrolyte ELR-W2 comprises 10 vol. % DEC and 10 vol. % DMC as linear carbonate components.

In some designs, it may be advantageous for the LMP solvents in the suitable electrolyte compositions to exhibit a certain molecular size for optimal performance. In an example, the optimal size or size distribution of the LMP molecules may depend on the electrode characteristics (e.g., thickness, amount of binder, density, anode and cathode composition and capacity, etc.), electrolyte solvent mix utilized and/or cell cycling regime (temperature, voltage range, etc.). In an example, LMP molecules (e.g., in an LMP solvent mix, if more than one LMP solvent is utilized or in a single-solvent LMP composition) may preferably comprise, on average, from around 9 atoms to around 30 atoms per solvent molecule. In some designs, it may be also advantageous that LMP molecules (e.g., in an LMP solvent mix or in a single-solvent LMP composition) comprise, on average, from around 3 to around 10 carbon atoms in its molecular structure. In some applications, smaller LMP molecules (particularly smaller linear molecules) may result in reduced cell cycle stability. In some applications, larger LMP molecules (particularly larger linear molecules) may result in undesirably reduced rate performance of cells and, in some cases, reduced cell cycle stability. If linear esters are used as components of LMP solvent(s), it may be advantageous for such esters to comprise from about 3 to about 9 carbon atoms per molecule, on average, in some applications. If LMP solvent(s) comprise esters with side branches (additional functional groups), it may be advantageous for such esters to comprise from about 4 to about 12 carbon atoms per molecule, on average. In some designs, the average ester molecules (in LMP co-solvents) with 4-to-7 carbon atoms per molecule (on average) may provide the most stable performance in cells. In some designs, it may be advantageous for the majority (e.g., 50-100 vol. %) of molecules (e.g., ester molecules) in LMP solvent mixtures to comprise 4-to-6 (in some designs—5) carbon atoms per molecule.

Figure 6A:
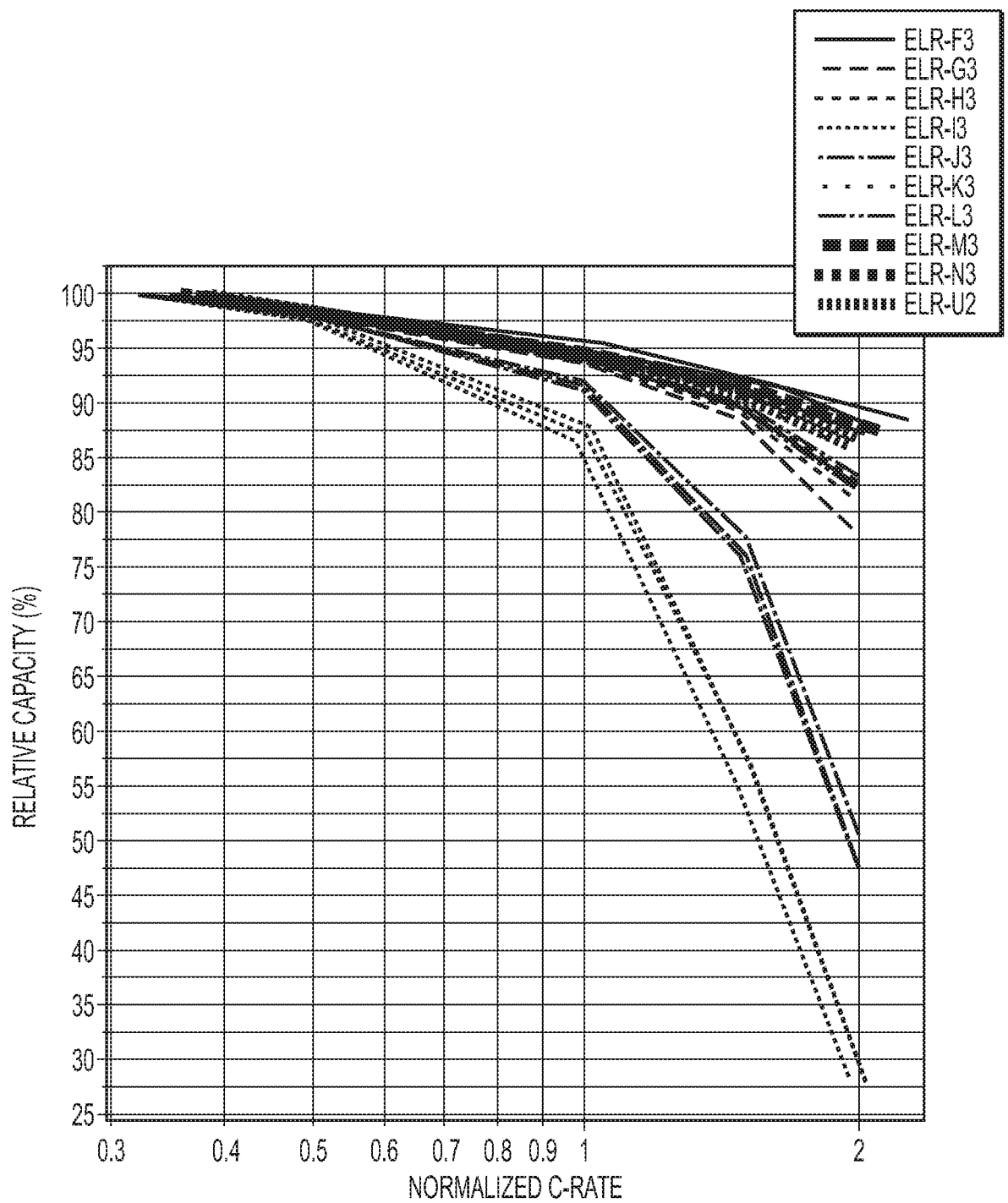
Figure 6B:
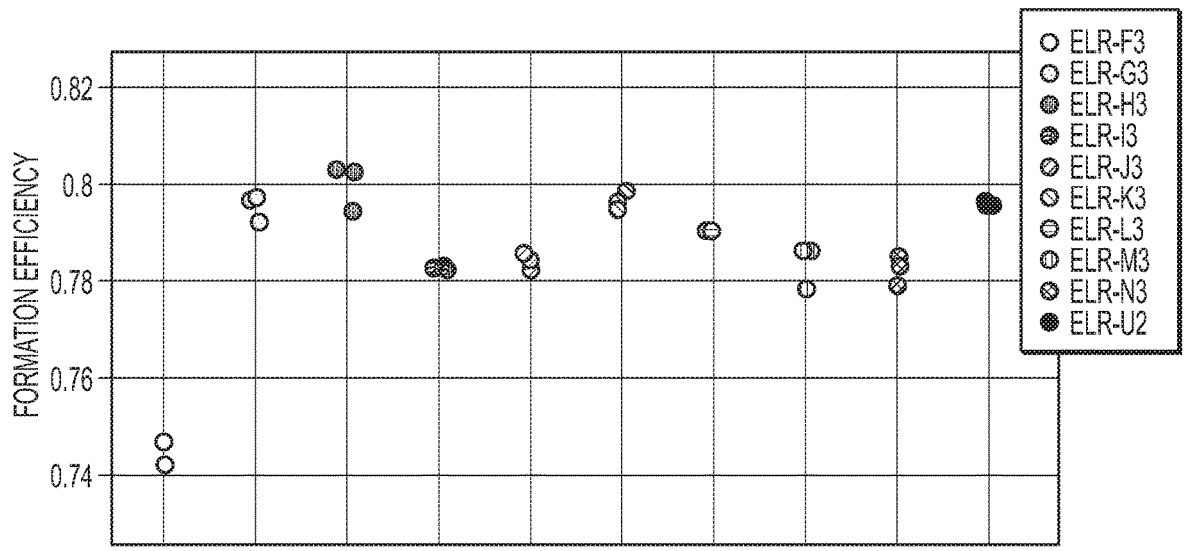
Figure 6C:
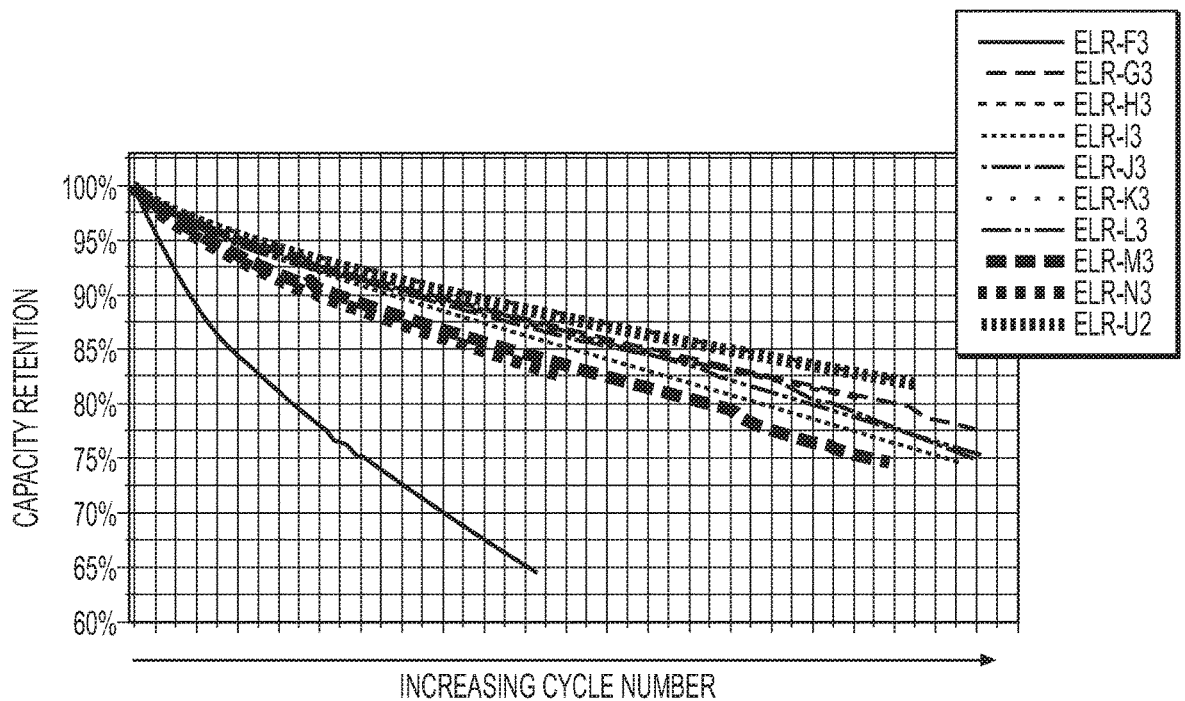

FIGS. 6A-6C illustrate the impact of other example electrolyte compositions on the performance of cells comprising a powder-based high capacity, Si-comprising nanocomposite anode and powder-based intercalation-type cathode (NCM, in this example) and cycled in the voltage range from 2.5 to 4.4 V (it will be appreciated that the cathode potential may approach or exceed about 4.5V vs Li/Li+ in this cell). Cycle stability was studied in several example cells cycled at "C/2" rate at 45° C. Two-to-three (2-3) near-identical cells were constructed and tested for consistency. In these examples, all electrolytes comprise 1M LiPF$_6$ and 0.2M LiFSI salts, 7 vol. % FEC, 23 vol. % PC, 20 vol. % of mixed linear carbonates, 2 vol. % cyclic carbonate as an ADD solvent, and 48 vol. % linear esters. Different molecular sizes were selected for each electrolyte. ELR-U2 electrolyte in the illustrated example comprises 48 vol. % of methyl butyrate. ELR-F3 electrolyte comprises 48 vol. % of methyl formate (MF). ELR-U2 electrolyte comprises 48 vol. % of methyl butyrate (MB). ELR-G3 electrolyte comprises 48 vol. % of methyl valerate (MV). ELR-H3 electrolyte comprises 48 vol. % of ethyl butyrate. ELR-I3 electrolyte comprises 48 vol. % of butyl valerate (BV). ELR-J3 electrolyte comprises 48 vol. % of butyl butyrate (BB). ELR-K3 electrolyte comprised 48 vol. % of ethyl propionate (EP). ELR-L3 electrolyte comprises 48 vol. % of propyl propionate (PP). ELR-M3 electrolyte comprises 48 vol. % of methyl propionate (MP). ELR-N3 electrolyte comprises 48 vol. % of ethyl acetate (EA). The rate performance of cells with this series of electrolytes was strongly correlated with the carbon chain length of the ester. For example, ELR-F3, with the shortest carbon chain length in the ester displays the best capacity retention at higher rates, whereas ELR-I3 with the longest carbon chain length in the ester displays the lowest capacity retention. Electrolytes ELR-K3 and ELR-U2, which have a total carbon chain length of four (and with 5 carbon atoms in the linear molecules), show the best long-term cycling performance at 45° C.

In some designs where ester(s) are used as co-solvent(s) in the suitable electrolyte mixture (e.g., for some cells with high-capacity nanostructured anodes and with high-voltage intercalation cathodes), it may be advantageous for the total fraction of esters in electrolyte solvent to range from about 20 vol. % to about 70 vol. % (in some designs comprising only linear esters, from about 30 vol. % to about 60 vol. %) as a total vol. fraction of all the solvents in the electrolyte. Both lower and higher ester fractions may lead to noticeably reduced cycle stability, particularly at elevated temperatures and in cells with high areal capacity loading electrodes.

Figure 7:
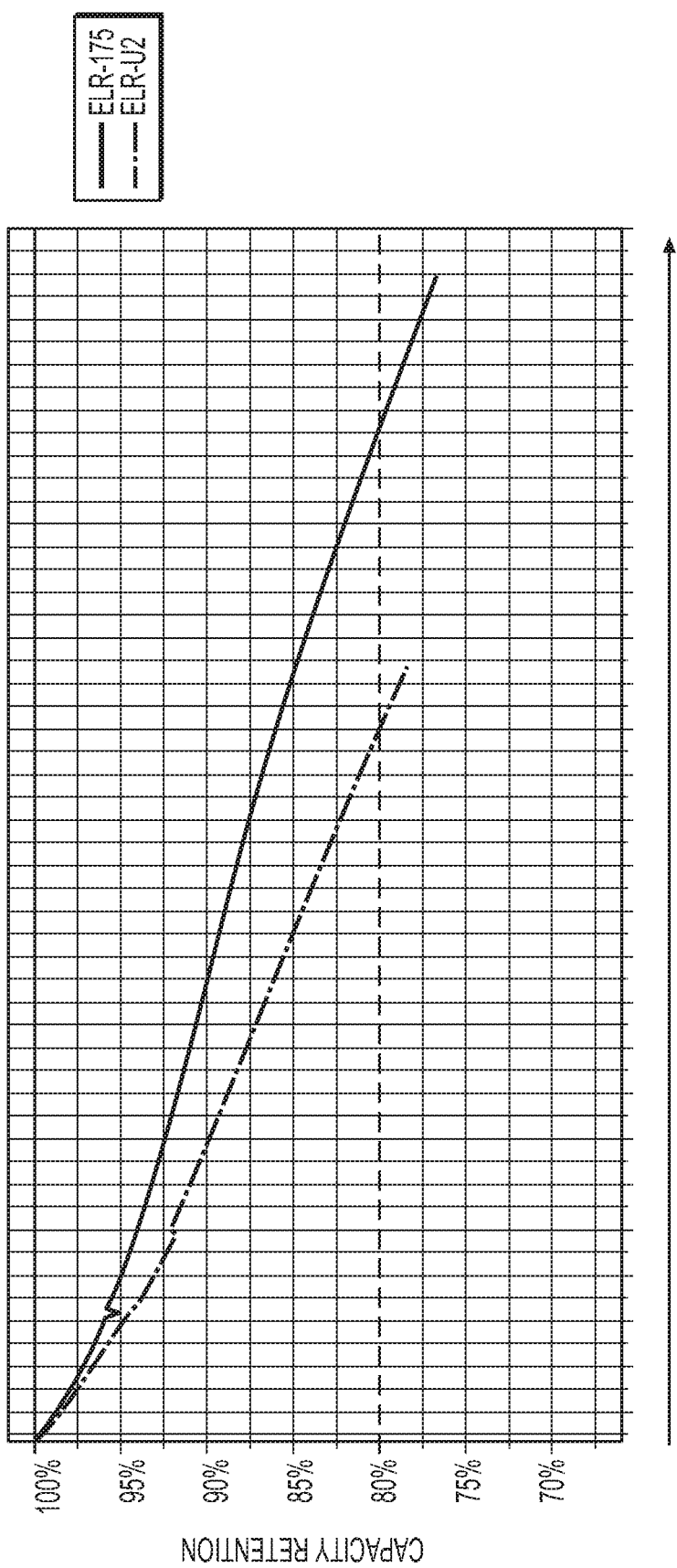

FIG. 7 illustrates the impact of other example electrolyte compositions on the performance of cells comprising a powder-based high capacity, Si-comprising nanocomposite anode and powder-based intercalation-type cathode (lithium nickel cobalt manganese oxide, NCM 622, in this example) and cycled in the voltage range from 2.5 to 4.4 V (it will be appreciated that the cathode potential may approach or exceed about 4.5V vs Li/Li+ in this cell). Cycle stability was studied in several example cells cycled at "C/2" rate at 45° C. Two-to-three (2-3) near-identical cells were constructed and tested for consistency for each electrolyte composition. Electrolyte ELR-U2 comprises 48 vol. % of linear ester (MB in this example). Electrolyte ELR-175 comprises 58 vol. % of the same linear ester (MB) and shows reduced cycle stability.

The nanocomposite anode particles in accordance with embodiments of the disclosure may generally be of any shape (e.g., near-spherical, cylindrical, plate-like, have a random shape, etc.) and of any size. The maximum size of the particle may depend on the rate performance requirements, on the rate of the ion diffusion into the partially filled particles, and on other parameters.

Some aspects of this disclosure may also be applicable to conventional intercalation-type electrodes and provide benefits of improved rate performance or improved stability, particularly for electrodes with medium and high capacity loadings (e.g., from about 4 to about 10 mAh/cm$^2$) and for cathodes exposed to higher potentials (e.g., from about 4.4 to about 5.4 V vs. Li/Li+).

In an example, the "size" of a nanocomposite particle may be determined in any of a variety of ways. In one example, the size of an individual particle may refer to the diameter of the particle if the particle is spherical or near-spherical. In another example, the size of an individual particle may refer to the diameter of an equivalent volume sphere (e.g., a representative same-volume sized sphere of the particle) of the particle if the particle is non-spherical (e.g., spheroidal, oblong, etc.). If the equivalent volume sphere approach is used, the total pore volume from the particle is retained in the equivalent volume sphere of the particle. In yet another example, for an irregularly shaped particle (e.g., an oblong particle), the size of an individual particle may refer to a smallest dimension of the particle (e.g., width) or a length of the particle (e.g., length). Hence, the various particle size ranges described with respect to embodiments of the disclosure may refer to sizes determined in accordance with any of the above-noted methodologies, based on the shapes and/or other characteristics of the respective particles.

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A metal-ion battery cell, comprising:
   an anode electrode with a capacity loading in the range of about 4 mAh/cm$^2$ to about 10 mAh/cm$^2$ and comprising anode particles including an active material and that have an average particle size in the range of about 0.2 microns to about 40 microns, the active material comprising one or more of silicon, germanium, antimony, aluminum, magnesium, zinc, gallium, arsenic, phosphorous, silver, cadmium, indium, tin, lead, bismuth, or an alloy thereof;
   a cathode electrode comprising an intercalation-type active material including at least Li, one or more metals, and oxygen;
   a separator electrically separating the anode electrode and the cathode electrode; and
   an electrolyte ionically coupling the anode electrode and the cathode electrode, wherein the electrolyte comprises a metal-ion salt composition and a solvent composition, the solvent composition comprising a low-melting point solvent composition with a melting point in the range from about −140° C. to about −60° C. and is in the range from about 10 vol. % to about 95 vol. % of the solvent composition.

2. The battery cell of claim 1, wherein the intercalation-type active material comprises lithium nickel cobalt manganese oxide (NCM), lithium nickel cobalt aluminum oxide (NCA), lithium manganese oxide (LMO), or a mixture thereof.

3. The battery cell of claim 1, wherein the low-melting point solvent composition comprises one or more phosphorous-comprising solvents, one or more cyclic or linear esters, one or more cyclic or linear ethers, one or more fluorinated solvents, one or more anhydrides, or a combination thereof.

4. The battery cell of claim 1, wherein the low-melting point solvent composition is in the range from about 20 vol. % to about 60 vol. % of the solvent composition.

5. The battery cell of claim 1, wherein the low-melting point solvent composition comprises one or more low-melting point solvents that comprise, on average, 4 to 6 carbon atoms in their molecular structure.

6. The battery cell of claim 5, wherein the one or more low-melting point solvents contribute to at least about 50 vol. % of all low-melting point solvents in the electrolyte.

7. The battery cell of claim 1,
   wherein the low-melting point solvent composition in the solvent composition is at least partially fluorinated.

8. The battery cell of claim 1, wherein the solvent composition further includes an additive solvent or solvent mixture.

9. The battery cell of claim 8,
   wherein the additive solvent or solvent mixture is in the range from about 0 vol. % to about 5 vol. % of the solvent composition, and
   wherein the additive solvent or solvent mixture comprises vinylene carbonate, vinyl ethylene carbonate, trimethylsilyl polyphosphate, tris(trimethylsilyl)phosphite, or lithium bis(oxalate)borate.

10. The battery cell of claim 1, wherein the metal-ion salt composition is present in the electrolyte at a concentration in the range of about 1.0 M to about 1.8 M.

11. The battery cell of claim 1, wherein the metal-ion salt composition comprises LiPF$_6$ or LiFSI.

12. The battery cell of claim 1, wherein the metal-ion salt composition comprises two or more metal-ion salts.

13. The battery cell of claim 12, wherein the two or more metal-ion salts comprise LiPF$_6$ and LiFSI.

14. The battery cell of claim 1, wherein the anode particles have a specific surface area in the range of about 0.5 m$^2$/g to about 50 m$^2$/g.

15. The battery cell of claim 1, wherein the anode particles exhibit a specific capacity in the range of about 600 mAh/g to about 2600 mAh/g.

16. The battery cell of claim 1,
   wherein the anode particles include an Si-comprising conversion-type active material, or
   wherein the anode particles include an Si-comprising alloying-type.

17. The battery cell of claim 1, wherein an amount of binder in the anode electrode is in the range from about 0.5 wt. % to about 14 wt. %.

18. The battery cell of claim 1, wherein a binder in the anode electrode swells by less than about 30 vol. % when exposed to the electrolyte.

19. The battery cell of claim 1, wherein the battery cell is a Li-ion battery cell.

20. The battery cell of claim 1, wherein the cathode electrode exhibits a highest charging potential in the range from about 4.2 V vs. Li/Li+ to about 5.1 V vs. Li/Li+.

* * * * *